(12) United States Patent
Khare et al.

(10) Patent No.: US 8,379,482 B1
(45) Date of Patent: Feb. 19, 2013

(54) USING SEISMIC ATTRIBUTES FOR DATA ALIGNMENT AND SEISMIC INVERSION IN JOINT PP/PS SEISMIC ANALYSIS

(75) Inventors: Vijay Khare, Sugar Land, TX (US); Alexander A. Martinez, Houston, TX (US); Michael P. Matheney, The Woodlands, TX (US); Reeshidev Bansal, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 540 days.

(21) Appl. No.: 12/683,869

(22) Filed: Jan. 7, 2010

Related U.S. Application Data

(60) Provisional application No. 61/144,233, filed on Jan. 13, 2009, provisional application No. 61/166,531, filed on Apr. 3, 2009.

(51) Int. Cl.
*G01V 1/00* (2006.01)
(52) U.S. Cl. ............................................. 367/73; 367/75
(58) Field of Classification Search .................... 367/38, 367/73; 702/14, 17
See application file for complete search history.

(56) References Cited

U.S. PATENT DOCUMENTS

| 6,611,764 | B2 | 8/2003 | Zhang | 702/18 |
|---|---|---|---|---|
| 7,082,368 | B2* | 7/2006 | Nickel | 702/17 |
| 7,859,943 | B2* | 12/2010 | Herwanger | 367/38 |

OTHER PUBLICATIONS

Aid, K. et al. (1980) *Quantitative Seismology Theory and Methods*, W. H. Freeman & Co., p. 148.
Contreras, A. et al. (2007) Sensitivity Analysis of Data-Related Factors Controlling AVA Simultaneous Inversion of Partially Stacked Seismic Amplitude Data: Application to Deepwater Hydrocarbon Reservoirs in the Central Gulf of Mexico, *Geophysics* 72.1, pp. C19-C29.
Debeye, H. W. J. et al. (1990) "$L_p$-Norm Deconvolution," *Geophysical Prospecting* 38.4, pp. 381-403.
Fomel, S. et al. (2003) "Multicomponent Seismic Data Registration by Least Squares," *SEG Intl Exposition and Seventy-Third Annual Meeting*, 4 pgs.
Gaiser, J. (1996) "Multicomponent $V_p/V_s$ Correlation Analysis," *Geophysics* 61.4, pp. 1137-1149.
Garotta, R. et al. (2002) "Combined Interpretation of *PP* and *PS* Data Provides Direct Access to Elastic Rock Properties," *The Leading Edge*, pp. 532-535.
Herrenschmidt, A. et al. (2001) "Comparison of Different Strategies for Velocity Model Building and Imaging of *PP* and *PS* Real Data," *The Leading Edge*, pp. 984-995.
Jing, C. et al. (2004) "Resolvability Analysis for Rock Property Inversions of Multicomponent Seismic Data," $74^{th}$ *Ann. Internat. Mtg., Soc. Expl. Geophys., Expanded Abstracts*, pp. 897-900.

(Continued)

*Primary Examiner* — Isam Alsomiri
*Assistant Examiner* — Krystine Breier
(74) *Attorney, Agent, or Firm* — ExxonMobil Upstream Research Company Law Dept.

(57) ABSTRACT

Method for aligning converted wave seismic reflection data (PS data) with conventional PP seismic reflection data so that both data types may be used to more accurately image the subsurface for hydrocarbon exploration or field development. Amplitude vs. angle (AVA) or amplitude vs. offset (AVO) attributes of PP and PS seismic data are identified and defined, which attributes are theoretically expected to be in phase and optimize seismic resolution in the data. In one embodiment of the invention, such attributes are calculated (310), then the same horizons are identified in a series of PP attributes and in a series of PS attributes, then the second series is aligned with the first at the horizon locations (316, 320), then a time transfer function is generated and applied to the PS mode data (322), and the aligned joint-mode data are inverted (326) using, for example, AVA attributes.

30 Claims, 14 Drawing Sheets

OTHER PUBLICATIONS

Kurt, H. (2007) "Joint Inversion of AVA Data for Elastic Parameters by Bootstrapping," *Computers & Geosciences* 33, pp. 367-382.

Mahamoudian, (2006) M.S. Thesis, Dept. of Geology and Geophysics, University of Calgary, Chapter 2, pp. 14-30.

Margrave, G. F. et al. (2001) "Joint *PP* and *PS* Seismic Inversion," *The Leading Edge*, pp. 1048-1052.

Van Dok, R. et al. (2003) "Event Registration and $V_p/V_s$ Correlation Analysis in 4C Processing," *SEG Intl Exposition and Seventy-Third Annual Meeting*, 4 pgs.

Viere, H. H. et al. (2006) "Simultaneous Inversion of *PP* and *PS* Seismic Data," *Geophysics*, 71.3, pp. R1-R10.

* cited by examiner

USING SEISMIC ATTRIBUTES FOR DATA ALIGNMENT AND SEISMIC INVERSION IN JOINT PP/PS SEISMIC ANALYSIS

CROSS REFERENCE TO RELATED APPLICATIONS

This application claims the benefit of both U.S. Provisional application 61/144,233 filed on 13 Jan. 2009 and U.S. Provisional application 61/166,531 filed on 3 Apr. 2009.

FIELD OF THE INVENTION

Exemplary embodiments of the present invention relate to methods for aligning compressional wave (PP) and converted shear wave (PS) reflection data and seismic inversion in joint PP/PS seismic analysis.

BACKGROUND OF THE INVENTION

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

In the oil and gas industry, seismic prospecting techniques commonly are used to aid in the search for and evaluation of subterranean hydrocarbon deposits. A seismic prospecting operation consists of three separate stages: data acquisition, data processing, and data interpretation. Success of the operation depends on accurate and geologically consistent completion of all three stages.

In the data acquisition stage, a seismic source is used to generate an elastic wave, which propagates in the form of a seismic signal into the subsurface structure of the earth. The elastic wave is at least partially reflected from a boundary between one or more layers, generally due to contrasts in layer properties. More specifically, adjacent layers in the subsurface have different physical properties due to changes in lithology and fluids, and thus may present different densities and velocities affecting the strength of the reflected elastic wave. The contrast in these properties at the boundaries between adjacent layers causes the reflections that may then be recorded by a receiver as a seismic trace and processed for imaging the subsurface. The processed seismic trace can be modeled as a convolution of the Earth's impulse response with the seismic signal produced by the source.

Generally, elastic wave propagation through earth subsurface may create a complex seismic response with different reflection and transmission modes. Two types of elastic waves may be generated during reflection and/or transmission at a boundary between layers, which are compressional waves (P-waves) and shear waves (S-waves). P-waves propagate with a higher velocity through the Earth than S-waves, generally by a factor of two to four and therefore arrive at detectors earlier than S-waves. P-waves are compressional waves that are longitudinally polarized. In other words, the particle motion is aligned with the direction of the wave propagation through the layers. By contrast, the S-waves are shear waves in which the particle motion is perpendicular to the direction of wave propagation. S-waves are generally grouped into two classifications, SV-waves, in which the particle motion is aligned in the plane of reflection, and SH-waves, in which the particle motion is perpendicular to the plane of reflection. Typically, S-wave reflections are generated when a P wave is incident at a non-zero angle of incidence to the reflecting surface.

For example for a P-wave source, data collected from the arrival of P-waves are generally referred to as PP mode data, because these events involve seismic energy that is emitted as a P-wave and that arrives at the receiver as a P-wave. Similarly also for a P-wave source, data arising from the arrival of S-waves are generally referred to as PS mode data, because these events involve energy that is emitted as a P-wave and that undergoes mode-conversion to an S-wave upon reflection and so arrives at the receiver as an S-wave. Vertical and horizontal components typically measured in 3-component seismic data may generally be a combination of PP and PS modes. PP mode data may contribute more strongly in vertical components of the acquired seismic data, whereas PS mode data may contribute more strongly in the horizontal component of the acquired seismic data.

In multi-component seismic acquisition, response of subsurface is measured by multi-component receivers. During the data processing stage, the recorded seismic signals are separated into dominant PP and PS modes, refined and enhanced using a variety of procedures that depend on the nature of the geologic structure being investigated and on the characteristics of the raw acquired seismic data. Processed seismic data contains useful subsurface information in a frequency range defined by the "seismic bandwidth" of the data which depends upon seismic sources and receivers used in the seismic survey. Seismic bandwidth may be enhanced during seismic processing. In general, the purpose of the data processing stage is to produce a data representation, or image, of the subsurface from the acquired seismic data for use during the data interpretation stage.

The results of the data interpretation stage may be used to determine the general geologic structure of a subsurface region, to estimate rock properties, to locate potential hydrocarbon reservoirs, and/or to guide the development of a previously discovered reservoir. The accuracy of the image obtained by analyzing the seismic signals may be limited by the amount of data obtained for a specific site. Accordingly, using both PP mode data and PS mode data may improve the accuracy of the image. However, the difference in P-wave and S-wave propagation velocities, among others, necessitates aligning PP and PS mode reflection data and makes combining data collected in the different modes challenging in a joint PP/PS analysis. In seismic literature, PP/PS alignment is often referred to as data registration. When the terms "alignment" or "align" are used herein in the sense of aligning two sets of data, it is noted that the terms "registration" or "register" could alternatively be used instead. Previous techniques to align PP and PS data (Fomel et al, "Multicomponent Seismic Data Registration by Least Squares," SEG Intl Exposition and Seventy-Third Annual Meeting (2003); Van Dok et al., "Event Registration and Vp/Vs Correlation Analysis in 4C Processing," SEG Intl Exposition and Seventy-Third Annual Meeting (2003); and U.S. Pat. No. 7,082,368 to Nickel (2006)) are developed using generic PP mode and PS mode reflection data volumes. However, because of the differences in phase and amplitude of PP and PS reflections, all forms (for example, near stack, full stack, angles stacks) of PP mode and PS mode data may not fulfill the assumption implicit in the alignment techniques. Many alignment techniques may force a match the between PP mode and PS mode data even where such a match may not be theoretically justified. This forced matching can lead to time alignment errors with serious effects in joint PP/PS inversion and geologic interpretation of PP/PS data. To alleviate the phase problem, seismic envelope data is often used for alignment, but envelope data lack the seismic resolution critical for accurate registration of PP and PS data. Responding to these needs, the present invention discloses use of certain derivative products of PP and PS seismic data that are theoretically expected to be in phase and retain the seismic resolution in the data.

SUMMARY OF THE INVENTION

An exemplary embodiment of the present invention provides a method for transforming PP mode data and PS mode data into an enhanced data representation of a subsurface region. The method may include obtaining seismic data having PP mode data and PS mode data, calculating a first series of seismic attributes describing the variation in the PP mode data as associated with properties of a subsurface region, and calculating a second series of seismic attributes describing the variation in the PS mode data as associated with properties of the subsurface region. The attributes may be selected such that the attributes of the first series are theoretically expected to be phase consistent with the attributes of the second series. A refined alignment of at least a portion of the seismic data may be performed based at least in part on the first series and the second series to create an aligned data volume. The aligned data volume may be inverted to obtain a representation of the subsurface region.

In an exemplary embodiment, one of the calculating the first series of seismic attributes, the calculating the second series of seismic attributes, and both, may be an amplitude versus angle (AVA) calculation or an amplitude versus offset (AVO) calculation.

The method may further include performing a first pass alignment of the PS mode data with the PP mode data to create a first pass aligned attribute volume prior to performing the refined alignment. If the method includes a first pass alignment, the first pass alignment may be based at least in part upon selected horizons that are interpreted to be the same in the PS mode data and the PP mode data. In another exemplary embodiment, the first pass alignment may be based at least in part upon an estimate of the $V_p/V_s$ ratio in the seismic data, a time varying function for the $V_p/V_s$ ratio in the seismic data, or a $V_p/V_s$ volume from the seismic data, or any combinations thereof. The first pass alignment may also be performed using offset stacks or angle stacks, or both, of the PP mode data and offset stacks or angle stacks, or both, of the PS mode data. The first pass alignment may be performed by identifying horizons in the first series and second series that are interpreted to be the same, aligning the second series to the first series at the horizon locations, interpolating time shifts of data between the horizons, generating a time-transfer function, and applying the time-transfer function to the at least a portion of the PS mode data and data volumes derived from it. Alternatively, the first series may be aligned to the second pass series at the horizon locations and time-transfer function may generated and applied to any combination of PP mode data and data volumes derived from it. The time-transfer function may be applied to any form of unaligned PS mode data (such as offset stacks, angle stacks, PS mode AVA attributes). In an exemplary embodiment, the PS mode data and the PP mode data may be spectrally balanced prior to the refined alignment.

Performing the refined alignment may include theoretically determining a combination of the first and second series that mathematically relate the first series to the second series. Further, performing the refined alignment may include analyzing physical data to determine a combination of the first series and second series that mathematically relate the first series to the second series. In addition, performing the refined alignment may include seismic modelling from geological scenarios to determine a combination of the first series and second series that mathematically relate the first series to the second series. Performing the refined alignment may also include aligning the first series and the second series using an alternative parameterization of the PP mode data.

Performing refined alignment may also involve an analysis of spectrally balanced first series and second series after the first-pass alignment to detect trends relating combinations of first series that empirically relate to combinations of second series. The analysis may involve two- or three-variable crossplotting and/or other more sophisticated mathematical technique to identify any underlying trends in attribute space. Geologic trends relating attribute combinations may be approximately identified from such analyses even though deviations from geologic trends are present due to alignment imperfections in the first-pass approximately aligned PP mode and PS mode data.

The refined alignment may be performed by lowering an error in a mathematical relationship between combinations of the first series and the second series by shifting time values for points in either the first series or the second series to generate a time-transfer function. Performing the refined alignment may include applying a time-transfer function to the PS mode data to substantially match the time values of the PS mode data to the time values of the PP mode data. In embodiments, the time-transfer function may be applied to other data to substantially match time values of the other data to time values of the PP mode data, wherein the other data comprise PS mode offset/angle stacks, previously inverted PS seismic data, S-wave impedance data, or combinations thereof among others.

The properties of the subsurface region may include the velocity of P-waves in the geological layers, the velocity of S-waves in the geological layers, the density of the geological layers, or any combinations thereof. Calculating a first series of seismic attributes and calculating a second series of seismic attributes may include using an Aki-Richards approximation (Aki and Richards, *Quantitative Seismology Theory and Methods*, W. H. Freeman and Co. (1980), p. 148).

In another exemplary embodiment, a method for producing hydrocarbons from a field is provided. The method includes obtaining seismic data having PP mode data and PS mode data, calculating a first series of seismic attributes describing the variation in the at least a portion of the PP mode data as associated with properties of a subsurface region, calculating a second series of seismic attributes describing the variation in at least a portion of the PS mode data as associated with properties of the subsurface region, performing a refined alignment of the at least the portion of the PS mode data with the at least the portion of the PP mode data based at least in part on aligning the first series and the second series to create a time-transfer function. The time-transfer function may be applied to another portion of the seismic data to create an aligned data volume, and the aligned data volume may be inverted to obtain a data representation of a subsurface region. A prediction of the location of hydrocarbons may be interpreted at least in part from the data representation of the subsurface region, and the hydrocarbons may be extracted from the subsurface region.

Another exemplary embodiment provides a tangible, machine-readable medium, that includes code adapted to calculate a first series of seismic attributes describing the variation in PP mode data as associated with properties of a subsurface region, and code adapted to calculate a second series of seismic attributes describing the variation in the PS mode data as associated with properties of the subsurface region.

The tangible, machine-readable medium may also include code adapted to perform a refined alignment of at least a portion of the seismic data based at least in part on the first series and the second series to create an aligned data volume, and code adapted to invert the aligned data volume to obtain a representation of the subsurface region.

The code adapted to perform the refined alignment may include an error minimization function. Further, the code adapted to perform the refined alignment may include a mathematical relationship between the first series and the second series.

DESCRIPTION OF THE DRAWINGS

The advantages of the present invention are better understood by referring to the following detailed description and the attached drawings, in which.

Figure 1:
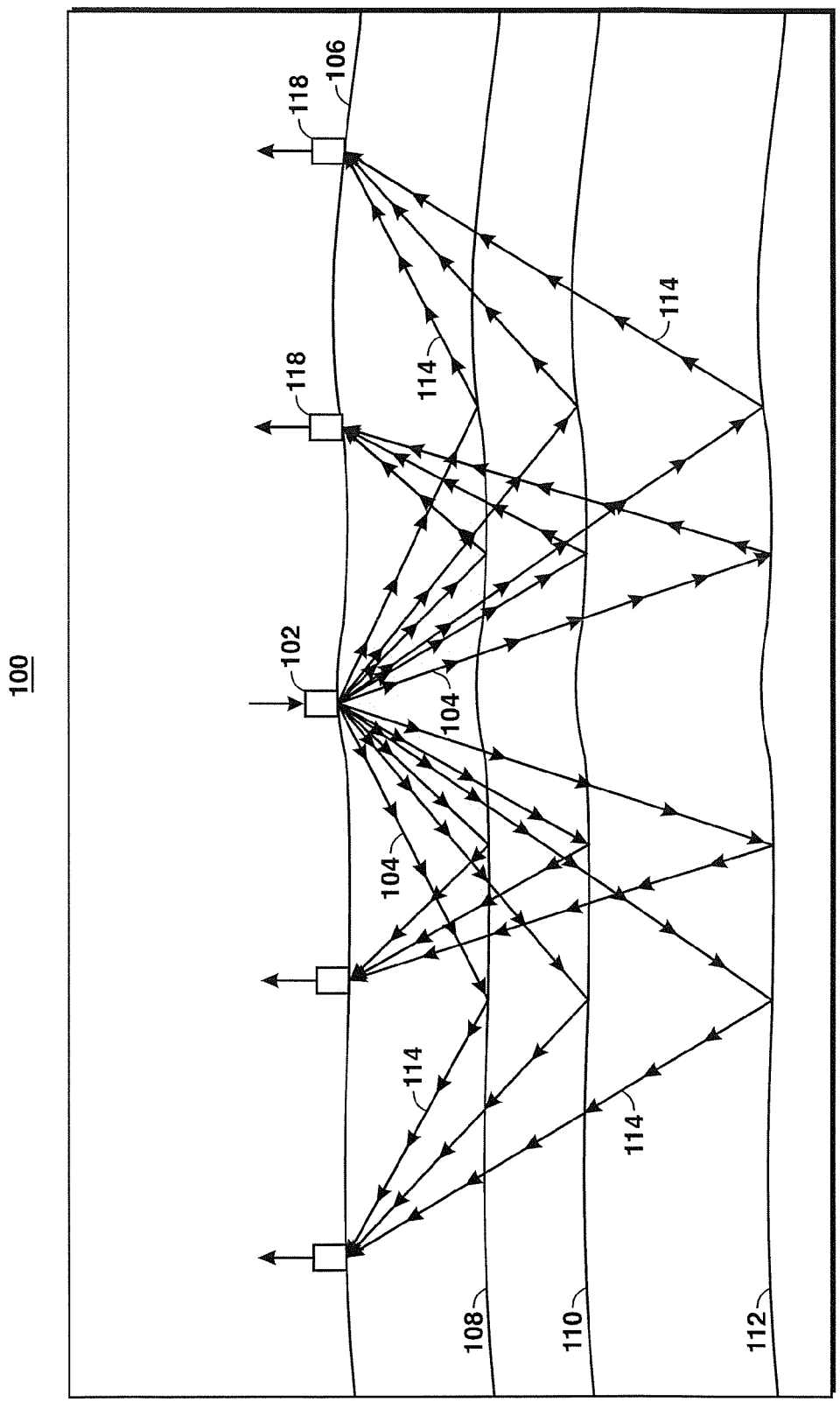
FIG. 1 is a drawing illustrating an exemplary arrangement of a seismic source and receivers for the acquisition of seismic data.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION OF EXAMPLE EMBODIMENTS

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

As used herein, "attribute" means the result of a specific mathematical operation performed on seismic amplitudes. After the calculation of the attribute, it may be considered to be an alternative representation of the seismic response contained in the original seismic data set (e.g., another value associated with a space-time location representing a data point) and can be stored in the same format as seismic volumes. Generally, attributes are influenced by seismic processing, but their usefulness comes from their dependence on specific properties of the subsurface material.

As used herein, "AVA" (amplitude versus angle) is a seismic data analysis method based on analyzing the variation in the amplitude of reflected waves with changes in the angle between the ray for the incident wave and the direction locally perpendicular to the reflecting interface. The AVA response of the reflection events associated with the boundaries between the reservoir rock and the surrounding sealing rocks depends on the properties of the fluid stored in the reservoir pore space and the contrast in the reservoir rock properties of the reservoir and surrounding rocks.

As used herein, "AVA attributes" are quantities calculated from the variation of seismic amplitudes with incident angle of P wave. The AVA attributes include intercept and gradient, and AVA inversion products, such as P-wave impedance ($I_p$), S-wave impedance ($I_s$), density, and/or combinations thereof. Also, it should be noted that the AVA attributes are data volumes of values calculated from AVA parameterization of seismic data.

As used herein, "AVO" (Amplitude versus offset) analysis is a seismic data analysis method of analyzing the variation in the amplitude of reflected waves with changes in the distance (offset) between the seismic source and receiver. Similarly as used herein "AVA" (Amplitude versus Angle) analysis is a seismic data analysis method of analyzing the variation in the amplitude of reflected waves with changes in the angle of incidence. Generally, the AVO attributes are similar to the AVA attributes, although based on offset and not angle. The use of AVA attributes herein is not meant to exclude AVO attributes. In every location herein that uses AVA attributes, AVO attributes may be used instead of or in addition to the AVA attributes. Accordingly, at every point herein that angle stacks are used, offset stacks may be used.

As used herein, "boundaries" refer to locations of changes in the properties of subsurface rocks, which typically occur between geologic formations, lithology changes, and fluid changes.

As used herein, "geological layers" refers to layers of the subsurface (e.g., the Earth's subsurface) that are disposed between geologic formation tops and lithology changes, each of which produce seismic reflections subsequently mapped by interpreters as seismic horizons.

As used herein, "geophysical data" is intended to refer to any data derived from measurements of the Earth. In some instances, such geophysical data may comprise seismic data, well log measurements, or data resulting from inversion of seismic data, but may alternatively encompass magnetic data, electromagnetic data, gravimetric data, and the like. Furthermore, the seismic data may comprise raw field recordings or may comprise data that have been preprocessed using known techniques such as stacking, migration, and the like. For instance, the seismic data may comprise prestack data, offset stack data, angle stack data, migrated poststack data, and the like.

As used herein, "geological scenarios" are earth models that represent the properties of the geological layers in the subsurface. The scenarios may be based on well log data, expected properties for the area, or properties taken from similar fields.

As used herein, "horizons" or "seismic horizons" are mechanically marked boundaries in the subsurface structures that are deemed important by an interpreter. Marking these boundaries is done by interpreters when they interpret seismic volumes by drawing lines on a seismic section. Each line represents the presence of an interpreted surface at that location. An interpretation project typically generates several dozen and sometimes hundreds of horizons.

As used herein, "impedance" is the product of seismic velocity and the density. Impedance typically varies among different rock layers, e.g., opposing sides of an interface have different impedances. Two types of impedance terms are generally defined, $I_p$ and $I_s$, wherein $I_p$ is P-wave impedance, also called acoustic impedance, and $I_s$ S-wave impedance. The reflection coefficient of an interface generally depends on the contrast in these impedances and density of the rock on either side of the interface. Specifically, the contrast in these properties of geological layers affects the reflection coefficient at the boundary separating the two layers. One geophysical process for determining the impedance and/or the density structure of a subsurface region based on recorded seismic reflection data is seismic inversion.

As used herein, an "interface" is an edge of a geologic model and/or a boundary of a volumetric region of the geologic model. Interfaces may separate regions having contrasting flow properties, and/or behave as a barrier or conduit to flow. Interfaces can separate regions that include but are not limited to stratigraphic regions, such as sequences or parasequences, facies regions, such as shale layers or individual channels, petrophysical and/or digenetic regions, such as cemented, porous or fractured regions, and structural regions, such as fault blocks.

Elastic waves may propagate through elastic media, such as subsurface layers, in two different "modes: compressional or P-waves, wherein particle motion is in the direction of wave travel; and transverse shear or S-waves, which may be polarized in two orthogonal directions, with motion perpendicular to the direction of wave propagation. The different modes may provide different insights into material present within the earth. For example, P-waves propagate through both fluids and solids, while shear waves do not propagate through fluids. Among other differences, as discussed in detail below, the various modes of propagation are distinguishable by their relative velocities. The velocity of compressional and transverse shear waves is a function of the elastic constants and the density of the medium through which the waves travel. The S-wave velocity is, for practical purposes, about one-half to one-fourth that of P-waves.

As used herein, "PP mode" is a reflection mode wherein for a P-wave incident on a layer boundary, a P-wave is reflected back to the receiver and "PS mode" is a data collection mode wherein an S-wave is reflected back to the receiver. The two types of data may generally be termed "seismic data." Originally recorded 3-component seismic data is processed for separation of the measured seismic data into PP mode data and PS mode data, corresponding to each reflection type. Unless further description is used, the terms themselves (e.g., PP mode data, PS mode data and seismic data) represent the amplitude value for the seismic signal within the space time matrix, such as the amplitude of an angle gather, among others. As discussed herein, each of PP mode data and PS mode data may include such data as offset gathers, offset stacks, angle gathers, angle stacks, impedance, velocity, density, modulus, and various AVA attributes, among others. In this context, the PP mode data and PS mode data are considered data "volumes" as described below.

As discussed herein, a source P-wave may be reflected as an S-wave, or alternatively, a source S-wave may be reflected as a P-wave. A reflected seismic wave that has a mode different than the mode of the incident seismic wave may be referred to as a "mode-converted seismic wave." Thus, a reflected S-wave produced from reflection of an incident P-wave is one example of a mode-converted seismic wave. As such, reflections from a subterranean structure may include both P-waves and S-waves. As noted above, a seismic surveying technique according to some embodiments may estimate absorption parameters for mode-converted seismic waves, which allows the seismic surveying technique to take into account absorption effects associated with mode-converted seismic waves. Considering absorption effects of reflected mode-converted seismic waves, as well as absorption effects of reflected pure, or single-mode, seismic waves, improves the accuracy of seismically derived rock/fluid properties.

As used herein, "receivers" are devices, usually placed in an array or grid-like pattern on the surface of the Earth or just beneath, used to detect reflections of vibrations from rock strata. Measurement of the amplitude and arrival time of an arriving reflected wave at numerous locations allows the mapping of rock strata, and provides information about the thickness and composition of the rock strata (e.g., layers). The receivers may include geophone, vibration detectors, accelerometers, or any other detector capable of accurately measuring the amplitudes of reflected waves.

As used herein, "reflection coefficient" means the ratio of the amplitude of the reflected wave to that of the incident wave. Generally, at small offsets, a low impedance layer over a high impedance layer produces a positive reflection, and a high impedance layer over a low impedance layer produces a negative reflection.

As used herein, "seismic envelope data" refers to transformation of seismic data that retains the absolute value of the amplitude of the seismic signal but processes out the phase information. This may be derived from the signal value for either the PP mode data or the PS mode data.

As used herein, the terms "volume," "data volume," or "seismic volume" are synonymous and refer to particular seismic data defined at locations in a three dimensional (3-D) representation of seismic data. Thus, PP mode data or PS mode data may be represented as a multi-dimensional matrix of values, wherein three coordinates are used to represent the 3-D location of a particular data volume in time and space (e.g., x, y, and t) and numerous additional terms may be used to represent specific physical attributes associated with the volume, such as impedance, velocity, density, AVA attributes, and the like. The value along vertical axis in seismic volumes is typically two-way vertical travel time. Thus for PP mode data it is travel time taken ray paths representing P wave to travel from the source to the reflecting layer in subsurface back to the receiver. For PS mode data it is the travel time of a ray path for energy that is generated as a P wave at the source and, after mode conversion at the reflecting interface, arrives at the receiver location as an S-wave. If the seismic data are depth migrated, then the vertical axis in seismic volume is depth value of the reflecting interface.

As used herein, "$V_p$" is a value that characterizes the velocity of P-waves in the subsurface material. Similarly, as used herein, "$V_s$" is a value that characterizes the velocity of S-waves in the subsurface material. $V_p$ and $V_s$ may be obtained from well log measurements and/or by inversion of the seismic data and may be included in the data volumes.

As used herein, "Time-transfer functions" are mapping functions used to transform the PS mode vertical travel times to PP mode vertical travel times. This transformation is typically followed by resampling of PS mode data at PP mode time sample values. In an alternative embodiment "Time-transfer function" may be used to transform PP mode travel times to PS mode travel times, followed by re-sampling.

As used herein, "inversion," or "seismic inversion" is a process by which one attempts to find a numerical model of subsurface properties that reproduces the measured seismic response within a tolerance and satisfies geological and geophysical constraints. There are well-known methods of seismic inversion. These methods fall into one of two categories: iterative inversion or non-iterative inversion. Some non-iterative inversion methods assume a simple background model and update the model based on the input data. In comparison, iterative inversion uses the updated model as input to the next iteration of the inversion process.

As used herein, "band-limited inversion" is a process that results in estimation of the component of subsurface properties projected in the "seismic bandwidth" of the processed seismic data.

As used herein, "tangible machine-readable medium" refers to a medium that participates in directly or indirectly providing signals, instructions and/or data to a processing system. A machine-readable medium may take forms, including, but not limited to, non-volatile media (e.g. ROM, disk) and volatile media (RAM). Common forms of a machine-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, and other media from which a computer, a processor or other electronic device can read.

As used herein "well log data" are data obtained from analyzing wireline logs and core samples collected from drilled wells. The data may represent physical properties of the geological layers, such as $V_p$, $V_s$, and $\rho$, among others.

Seismic prediction of rock and fluid properties is beneficial in exploration and development of hydrocarbon reservoirs. The prediction of rock and fluid properties from seismic data is based in part on the underlying physics that relates the seismic response of hydrocarbon fields to geophysical properties of in-situ rock and fluids. However, seismic predictions have inaccuracies and ambiguities, due to inherent non-uniqueness in seismic inversion for rock properties prediction and often to inadequate information contained in the acquired seismic data. Jointly using PP and PS data tends to better constrain seismic prediction of rock and fluid properties.

FIG. 1 is a drawing illustrating an exemplary arrangement 100 of a seismic source and receivers (e.g., geophones, which may include three dimensional vibration detectors) for the collection of information on subsurface layers. As illustrated in FIG. 1, a seismic source 102 generates elastic waves that travel downward through a surface 106 and boundaries 108, 110, and 112 between geological layers. The elastic waves (e.g., source waves 104) may be generated by any number of systems, including explosives, seismic vibrators, airguns, and plasma sound sources, among others. The source waves 104 in the elastic wavefield are generally reflected from the boundaries 108, 110, 112 at which the properties of the subsurface layers change, e.g., to higher or lower density, or higher or lower propagation velocity, etc. The reflected elastic waves 114 may propagate back to the surface 106 and be detected by receivers 118.

Figure 2:
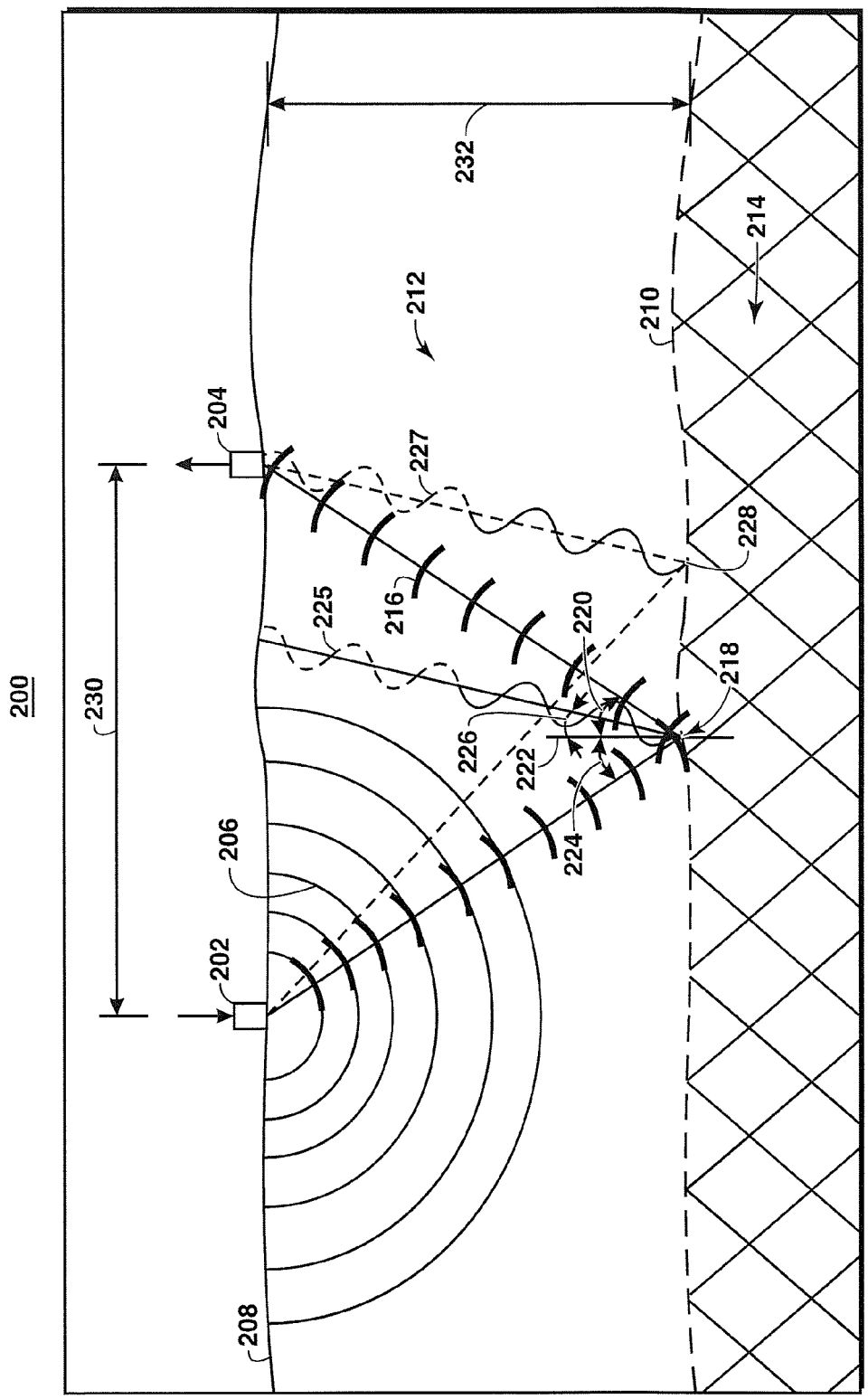
FIG. 2 is a drawing showing a single source and receiver that illustrates the reflection of an elastic wave generated by the source.

FIG. 2 is a drawing 200 showing a single source 202 and receiver 204 (e.g., a geophone) that further illustrates the reflected waves of an elastic wave generated by the source 202. In this example, the source 202 generates a source P-wave 206, which is indicated by the arcs directed downward below the surface 208, intersecting the boundary 210 between two geological layers 212 and 214. Two modes of reflections or reflected waves are created at the boundary 210, which may be detected by the receiver 204. The first reflected wave is a P-wave 216. The reflected P-wave 216 may generally be returned from a first reflection point 218 at an angle 220 between the P-wave 216 and a vertical line 222 at the reflection point that is the same as an angle 224 between the source P-wave 206 and the vertical line 222.

The reflection at the boundary 210 also creates an S-wave 225 from the first reflection point 218 through mode conversion, as defined herein. The S-wave 225 is transmitted through the geological layers 212 at a slower rate, e.g., by a factor of two to four times, than the P-wave 216 (as indicated by the dotted line continuation of S-wave 225). Further, the S-wave 225 may return to the surface 208 at a different angle 226 due to the slower velocity. That is, the angle 226 between the S-wave 225 and the vertical line 222 is less than the angle 220 between the P-wave 216 and the vertical line 222. Accordingly, the seismic data obtained at the receiver 204 may be a combination of the P-waves 216 from the first reflection point 218, and the S-waves 227 from a second reflection point 228. In the past, seismic analysis has focused on the PP mode data obtained from the P-wave reflections to the exclusion of the PS mode data obtained from the S-wave reflections.

The raw seismic data (i.e., the signals collected by the receiver 204) may generally be termed "shot gathers." For analysis, the "offset gathers" may be created in seismic processing and analyzed as a function of distance (e.g., offset 230) between the source 202 and the receiver 204. Further, the offset gathers may be combined over a range of offsets to form seismic data termed "offset stacks."

Alternatively, the offset gathers may be analyzed as a function of the reflection angle, such as reflection angle 220 or 226. The seismic data measured at each receiver 204 as a function of reflection angle 220 or 226 may be termed "angle gathers." The reflection angle 220 or 226 generally depends on the offset 230 and the depth 232 of the reflecting boundary 210.

Specific angles may be selected for the analysis (e.g., 10°, 30°, or 50°, among others) and all of the seismic data received from reflections within a range of the specific angles (e.g., ranges of 1°, 2.5°, or 5°, among others) may be stacked (e.g., grouped or summed) together. The resulting seismic data may generally be termed an "angle stack." For example, a 30° angle stack may be created by stacking offsets that fall within a specified angle range, for example, from about 27.5° to about 32.5°. Other techniques, such as common reflection angle migration, known in the art may be used to create the angle gathers and angle stacks, as discussed with respect to FIG. 6. Among other factors, the amplitude of the seismic data depend upon the angles in a manner that relates to the properties of the geophysical layers.

The present techniques provide methods to utilize the PS mode data to enhance the seismic analysis. More specifically, while the PS mode data respond to the contrasts in the geophysical properties similarly to the PP mode data, their amplitudes are related differently to rock properties. For example, while P-waves travel through liquids and solids, S-waves travel through solids, but do not travel through liquids. Further, for the same acquisition geometry, the PS mode data contain larger ranges of incidence angles than the PP mode data, which may be useful to stabilize $I_s$ and density estimations from seismic data.

However, the differences in angles and velocities between P-waves and S-waves, as well as the separate processing of the PP mode data and the PS mode data, complicates joint PP/PS analysis. For example, the difference in velocities between the S-wave and P-wave causes PP and PS arrival times of the events in the seismic data to differ. That makes it important to align (i.e., register) the PS mode data with the PP mode data, which is often a challenging task. For a geologically meaningful and geophysically consistent reservoir analysis using combined seismic data, it may be beneficial and often is essential to resolve the differences in the time values associated with the PS mode data and PP mode data.

Alignment of the PS mode data with the PP mode data may be performed using correlation techniques to squeeze, or compress, the time values of the PS mode data to match the time values of the PP mode data constrained by events in the two seismic data types that are interpreted to be geologically compatible. However, differences in the amplitudes and phases of the PP mode data and the PS mode data create complications in an alignment performed by this process. While the amplitude differences may be handled by various techniques, such as trace by trace correlations between the PP mode data and the PS mode data, the phase differences may result in serious alignment inaccuracies and subsequent erroneous seismic predictions. Embodiments of the present techniques use geophysical relationships to identify combinations of AVA attributes, as defined with respect to equations (1)-(7) discussed below, that are more likely to be in phase, i.e. are phase consistent, and therefore, provide more effective functions for alignment of the PS mode data and the PP mode data using correlation techniques.

Previously, event correlation has been used as a simple method for aligning the PS mode data with the PP mode data. Event correlation includes identifying horizons, e.g., seismic data representing a boundary 210 between two geological layers 212 and 214, which should represent the same feature in both the PP mode data and the PS mode data. The time values for the PS mode data may then be shifted to match the time values for the PP mode data at the time values of the horizons. PS mode data that lies between the time values of the horizons may be shifted by interpolating between the horizons. Generally, this process also involves resampling of the shifted data at the time samples because the shifted PS times may not be at time samples of the seismic volume. This process produces PS mode data that has time values matching those of the PP mode data. Alternatively, the process may result in the creation of additional time-shift values for each point in the multi-dimensional matrix of the PS mode data that indicate how much the time value for that point needs to be adjusted to match the corresponding point in the PP mode data (e.g., a time transfer function). However, assuming that the horizons identified in the PS mode data and the PP mode data do refer to the same boundary 210, accurate time-shifts are obtained only at the fixed horizon locations. Thus, the simplistic interpolated match of the time values of the PS mode data with the time values for the PP mode data is prone to errors which can significantly affect the accuracy of a seismic prediction made from a joint analysis.

Further, the typical process is to use alignment techniques on generic PP mode data and PS mode data without accounting for the differences in amplitude and/or phase in the PP and PS reflectivity. Accordingly, because of the differences in the phase and amplitude of the reflectivity of the PS mode data and the PP mode data, the form of the data selected for the analysis (for example, offset stacks, angle stacks, etc.) of the PP mode data and the PS mode data may not fulfill the assumptions implied in the alignment techniques. The alignment techniques may consequently force an artificial match between the PP mode data and the PS mode data, by minimizing a residual function or an objective function. However, this forced matching can lead to time alignment errors with serious effects on the accuracy of the joint PP/PS inversion and joint geologic interpretation of the PS mode data and the PP mode data.

To mitigate the phase problem, seismic envelope data may be used for alignment, but the seismic envelope data may lack the seismic resolution needed for accurate alignment of the PS mode data and PP mode data. It is therefore beneficial to use attributes calculated from the PS mode data and the PP mode data that are expected to be in phase and also retain the seismic resolution. Exemplary embodiments of the present invention provide methods to construct robust combinations of PP mode data and PS mode data that may reduce the problems from time varying phase differences.

Figure 3:
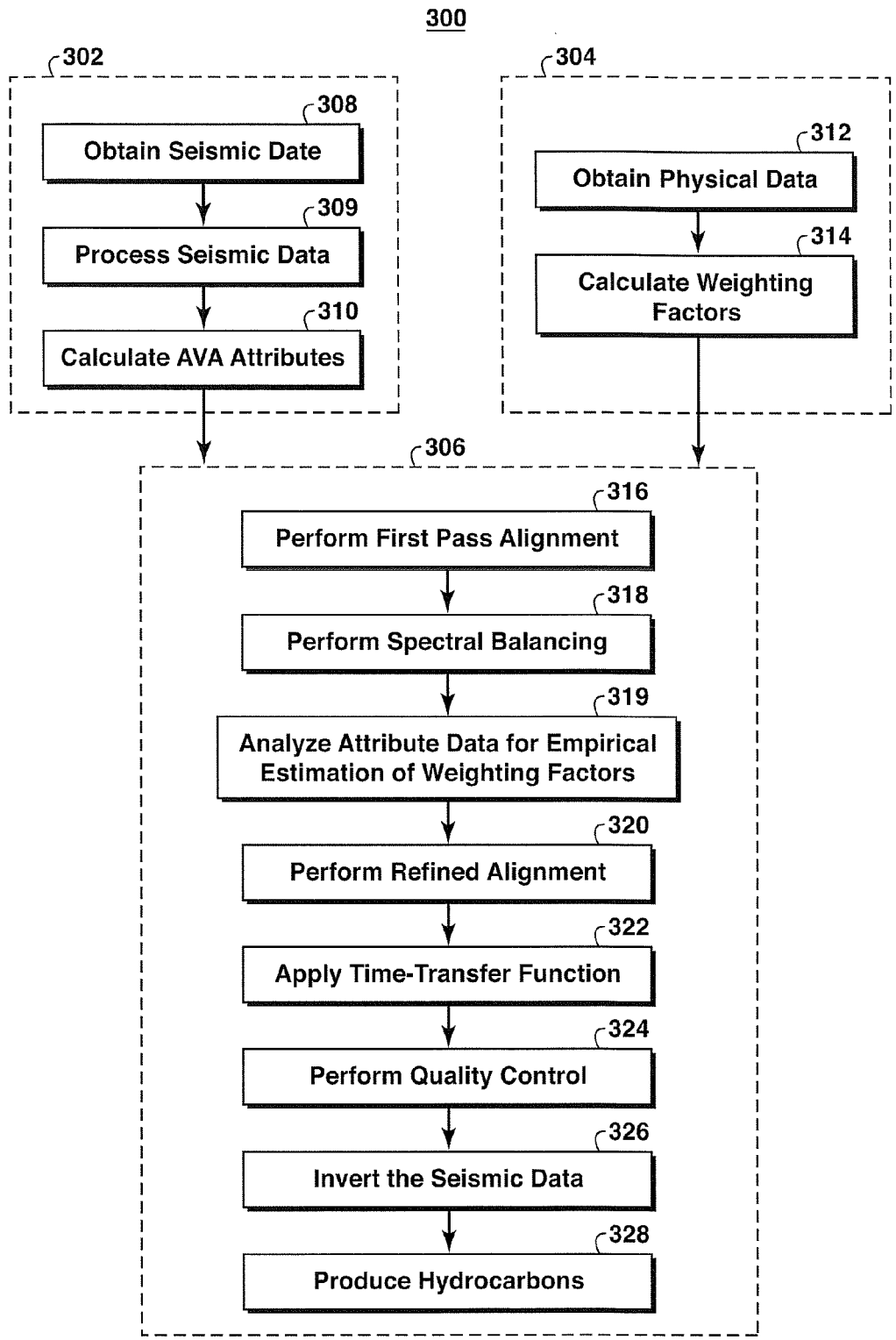
FIG. 3 is a process flow diagram showing an overview of a method for aligning PS mode data with PP mode data, in accordance with at least one exemplary embodiment of the present invention.

FIG. 3 is a process flow diagram showing an overview of a method 300 for aligning the PS mode data with the PP mode data in accordance with an exemplary embodiment of the present invention. Generally, the method 300 has three components, the first component is the generation of seismic attributes (e.g., AVA attributes) for the PS mode data and PP mode data, as indicated by block 302, and discussed further with respect to FIG. 6. The second component is the determination of weighting factors for combining the seismic attributes (e.g., weights for AVA attributes), as indicated in block 304, and discussed further with respect to FIG. 7. The third component is the use of the seismic attributes (e.g., AVA attributes) and the weighting factors to enhance alignment of the PS mode data with the PP mode data, as indicated by block 306, and discussed further with respect to FIG. 8. The enhanced alignment may include a first pass alignment and refined alignment along with other operations.

The method 300 begins with obtaining seismic data, as shown in block 308. Obtaining seismic data may include the simultaneous acquisition of both PS mode data and PP mode data. Alternatively, the PP mode data may have been obtained separately from the PS mode data. In either case, the seismic data may be processed in block 309. The processing of the seismic data may include migrating data, creating offset and/or angle stacks, for example. The seismic data may then be used to calculate or derive attribute data volumes as shown by the calculation of seismic attributes in block 310. The seismic attributes may be included into a single attribute volume having different columns and rows related to specific attributes or may be organized as individual attribute volumes for specific attributes. Accordingly, the seismic attributes (e.g., AVA attributes) may be termed as existing in "seismic attribute space" (e.g., "AVA attribute space") distinct from angle or offset domains. Specifically, as an example, the processed PP mode data and PS mode data (such as angle stacks, offset stacks, offset gathers, or angle gathers, among others) may be used to calculate AVA attributes for each data point in the three dimensional space of the PS mode data and the PP mode data volumes. When the AVA attributes are calculated from PP mode seismic data, they are expressed as PP attribute volume (e.g., PP mode AVA attribute volume) in PP two-way travel time. When the seismic attributes are calculated from PS mode data, they are expressed as PS attribute volume (e.g., PS mode AVA attribute volume) in two-way travel time of ray-paths with incident P-waves and reflected S-waves. In other embodiments, depth migrated data may be used for calculation of the AVA attributes. Depth migrated data PP and PS mode data volumes are both created as a function of depth rather than two-way travel time. Therefore, PP mode and PS mode attribute volumes calculated from depth migrated seismic data are approximately aligned by the procedure implicit in depth migration process. However, they but may require refined alignment discussed below.

For an enhancement in the alignment of the PS mode data and PP mode data, each of PP mode and PS mode attributes may be combined using weighting factors such that the resulting PP mode and PS data representations are phase consistent and therefore provide a robust control on alignment of PP mode and PS mode data. That is, the result is insensitive to the theoretical differences in the phase and amplitude of PP mode and PS mode reflectivity. The weighting factors may be derived from theoretical relationship between PP mode and PS mode attributes. For example, weights for combining PP mode and PS mode AVA attributes is discussed below with respect to equations (1)-(15). Alternatively, physical data on the geological layers may be obtained, as indicated in block 312, to derive weights suitable for the rock properties in the area. The physical data may include well log data, geological scenarios, or physical data collected from outcrops, and the like. Weighting factors may then be calculated in block 314. For example, the weighting factors or weights to combine seismic attributes, such as PP mode attribute A and B, may be derived from theoretical formulations, from area-specific analysis guided by the available well log data, from expected rock properties variations, or from combinations of these. The phase consistency of the resulting weighted PP mode seismic attribute volume and PS mode seismic attribute volume improves the alignment accuracy of the attribute data.

In block 316, a first pass alignment is performed on either the processed seismic data or the attribute volume. The first pass alignment may be guided by seismically interpreted horizons, initial estimates of $V_p/V_s$ ratio, or other values, as discussed with respect to FIG. 8, below. This process results in squeezing, or compressing, the time values for the PS mode data to approximate the time values of the PP mode data. For instance, the first pass alignment may be performed using horizons defined by seismic interpreters in the weighted seismic attribute volumes of block 310 (e.g., the PP mode attribute volume and the PS mode attribute volume). That is, the weighting factors calculated in block 314 may be applied to the attribute volume. In this process, a first pass time transfer function may be generated from the attribute volumes along with an approximate aligned attribute volume. Alternatively, the first pass alignment may be performed using horizons defined in the processed seismic data from block 309 (e.g., angle or offset stacks of the PP mode data and the angle or offset stacks of the PS mode data). Thus, a first pass time transfer function may be generated from this approach. The first pass time transfer function may then be applied to the AVA attribute volumes to generate an approximately aligned attribute volume. As another alternative, the time transfer function may be generated for the PP mode data and used to stretch the time values for the PP mode data to match the time values for the PS mode data. Regardless, the time transfer function may be applied to modify either PP mode data to PS mode data or PS mode data to PP mode data.

In an exemplary embodiment, the time transfer function may include values that are associated with every point in the PS mode data that indicate how the time of the particular data point should be shifted to match the time value for the corresponding data point in the PP mode data. Accordingly, the time transfer function may be considered to be a map wherein the time value of each point of the PS mode data is mapped to a corresponding time value in the PP mode data. If the first pass alignment is performed in AVA attribute space, the time transfer function may then be applied to other PS mode data (angle stacks, offset stacks etc.) to map the time values of the PS mode data to the time values of the PP mode data. The shifted time values may not always lie at the time samples of the attribute volume. A resampling may often be utilized based on known techniques to generate aligned attribute volumes.

Due to the depth varying differences in velocities and attenuation factors between the PS mode data and the PP mode data, the bandwidth of the aligned attribute volume (e.g. attributes from PP data mode and PS mode data) in the first pass alignment may be substantially different. To correct for this, spectral balancing may be performed prior to refining the alignment, in block 318. The spectral balancing technique, which is discussed in greater detail with respect to FIG. 8 below, is applied to the first-pass aligned attribute volume to improve the compatibility of the PS mode and PP mode seismic attribute volumes. The result is spectrally balanced seismic data and attribute data in volumes approximately aligned.

First-pass aligned and spectrally balanced PP mode attributes and PS mode attributes are analyzed (block 319) to detect any trends relating combinations of PP mode attributes to combinations of PS mode attributes. This analysis may involve cross-plotting analysis in two or three variables in combined PP mode and PS mode attribute space. For example, projections in three-variable attribute space to minimize the scatter may lead to alternative weighting factors for PP mode and PS mode attributes. Alternatively, trial combinations of PP mode attributes may be cross-plotted against those of PS mode attributes in two-variable crossplots to determine weights. The refined alignment described below resulting from alternative choices of weights (from blocks 314 and 319) may be evaluated in QC step in block 324.

In block 320, the first-pass of approximately aligned attribute volume is enhanced by performing a refined alignment of the approximately aligned attribute volume in the seismic attribute space (e.g., AVA attribute space). The refined alignment is generally performed by comparing the weighted combination of seismic attributes of the PP mode data with the weighted combination of seismic attributes of the PS mode data. The time values for the weighted combinations of seismic attributes of the PS mode data are then shifted to maximize correlation between the weighted combinations of seismic attributes of the PS mode data and the weighted combinations of seismic attributes of the PP mode data. This process results in a refined time transfer function. The result of this refined alignment is a second time transfer function (i.e., a refined or optimized time transfer function) and a more accurately aligned weighted PS mode attribute volume.

In block 322, the combination of first-pass time transfer function and refined second time transfer function may be applied to other PS data to generate the corresponding aligned PS data volumes. For instance, if the PP mode data is held fixed and PS mode data is being modified, the other data may include other PS attribute volumes, PS angle stacks, PS offset stacks or portions of the seismic data/processed seismic data. For example, the combined time transfer function may be used to map the time values of the PS mode data to the time values of the PP mode data. The aligned time data is resampled to generated aligned data volumes. At block 324, a quality control (QC) check may be performed on the aligned data volume to determine if the alignment is satisfactory. For example, the data predictions at particular time values may be compared to the corresponding well-log derived data obtained at corresponding times. Alternatively, a visual evaluation of the aligned data volume may be performed. After the alignment is determined to be satisfactory, the refined time transfer function may be applied to any other form of seismic data that may be used for joint PP/PS analysis, such as joint PP/PS interpretation or joint PP/PS seismic inversion. The aligned time data is resampled to generated aligned data volumes.

In block 326, the aligned data volume may be inverted to develop a representation (e.g., an image) of a subsurface region and the associated rock properties, such as a hydrocarbon reservoir, a cap rock over a hydrocarbon layer, or any other features of geologic interest. The data representation may then be used to predict a subsurface location for hydrocarbons.

The prediction of a subsurface region or layers may be used to produce hydrocarbons from the subsurface region, as shown in block 328. This may involve determining where to drill or how to change well operations (e.g., drilling producer or injection wells, secondary recovery techniques, or other known techniques) based on the predictions.

The calculation of the AVA attributes and weighting factors discussed with respect to the method 300 may be performed using numerous parameterizations that interrelate rock properties to seismic amplitudes, such as the Aki-Richards approximation. The Aki-Richards approximation relates the amplitudes of the measured seismic data to the contrasts in the properties of geological layers, for example, to P-wave velocity ($V_p$), S-wave velocity ($V_s$), and density ($\rho$). The properties may be combined to derive other properties, such as $I_s$ or $I_p$, which represent the impendence of the geological layers to transmitting S-waves and P-waves, respectively. The measured amplitudes of the seismic data may then be related to other useful combinations of these fundamental geophysical properties. The Aki-Richards approximation may be expressed as indicated in equations (1) and (2).

$$r_{pp}(\theta) = A + B \sin^2 \theta + C(\tan^2 \theta - \sin^2 \theta) \tag{1}$$

$$r_{ps}(\theta) = D \sin \theta + E \sin^3 \theta \tag{2}$$

In equations (1) and (2), $r_{pp}$ and $r_{ps}$ represent angle dependent reflectivity for the PP mode data and PS mode data, respectively. Their magnitude equals the ratio of the amplitude of the PP mode data or the amplitude of the PS mode data to the amplitude of the incident P-wave at a reflecting interface. The angle $\theta$ is the angle between the ray for the incident P-wave and the direction perpendicular (normal) to the reflecting interface. The AVA attributes A and B of the PP mode data are known to practitioners of the art as the PP intercept and the PP gradient. The AVA attribute D of the PS mode data is known as the PS gradient. The AVA attributes C and E are higher order Aki-Richards attributes that provide additional information about layer properties when the amplitudes of the seismic data at large angles, typically greater than about 45°, are reliable.

The AVA attributes of the PP mode data (A, B, and C) and of the PS mode data (D and E) depend upon the contrasts in the properties of the geological layers as shown in equations (3)-(7).

$$A = \frac{\Delta I_p}{2 I_p} \tag{3}$$

$$B = \frac{\Delta I_p}{2 I_p} - \frac{4}{\gamma^2} \frac{\Delta I_s}{I_s} + \left( \frac{4}{\gamma^2} - 1 \right) \frac{\Delta \rho}{2 \rho} \tag{4}$$

$$C = \frac{\Delta I_p}{2 I_p} - \frac{\Delta \rho}{2 \rho} \tag{5}$$

$$D = -\frac{2}{\gamma} \frac{\Delta I_s}{I_s} - \frac{\gamma - 2}{2 \gamma} \frac{\Delta \rho}{\rho} \tag{6}$$

$$E = \frac{\gamma + 2}{\gamma^2} \frac{\Delta I_s}{I_s} - \frac{2 \gamma + 5}{4 \gamma^2} \frac{\Delta \rho}{\rho} \tag{7}$$

In equations (3)-(7), $\gamma$ is the background ratio of compressional wave velocity and shear wave velocity (i.e., $V_p/V_s$), $\rho$ represents the density of the rock layers, $I_p$ represents the P-wave impedance, and $I_s$ represents the S-wave impedance. Fifth and higher powers of $\sin \theta$ have been neglected in deriving the expression for E shown in equation (7). The AVA parameterization in equations (1) and (2) is applied to reflection amplitudes in PP mode data volume and PS mode data volume to derive the corresponding PP mode AVA attribute volumes A, B, and C and PS mode AVA attribute volumes D and E. Because there are only three independent physical quantities, $I_p$, $I_s$, and $\rho$, the five AVA attributes (A, B, C, D, and E) are not independent, as discussed with respect to FIGS. 4 and 5. Accordingly, the relationships constraining the variations of AVA attributes may be used in devising robust alignment procedures.

Figure 4:
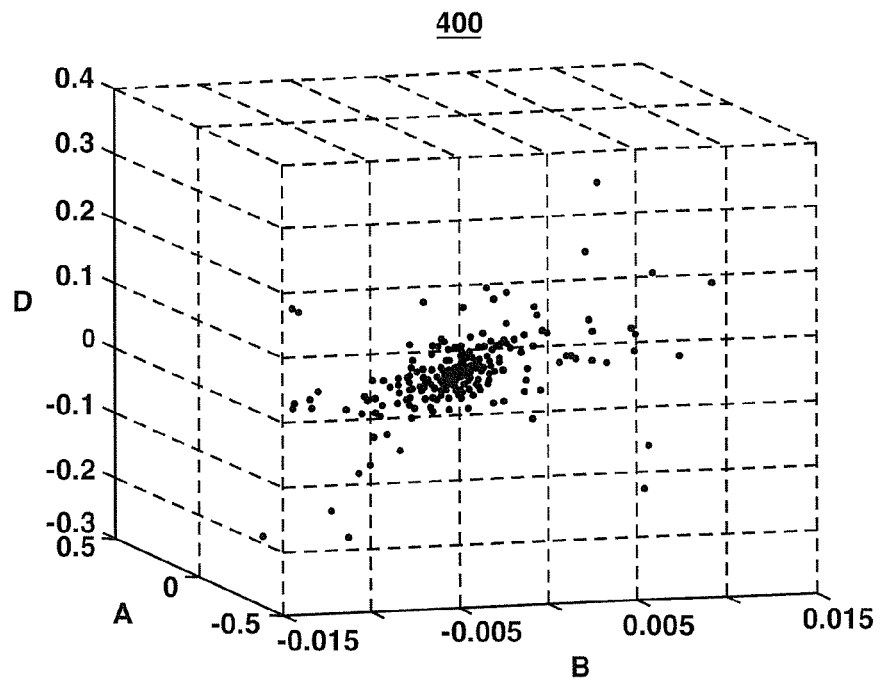
FIG. 4 is a three dimensional scatter-plot illustrating apparent scatter in the interrelationship of a first and a second seismic attributes, calculated from PP mode data, with a third seismic attribute, calculated from the PS mode data, in accordance with an exemplary embodiment of the present invention.

FIG. 4 is a three dimensional scatter-plot 400 illustrating the interrelationship of the AVA attributes A and B of the PP mode data with the AVA attribute D of the PS mode data. The AVA attributes use to generate the scatter-plot 400 were derived from well log data. Specifically, the data of compressional wave impedance ($I_p$) and density ($\rho$) were taken from the well log data, and the shear wave impedance ($I_s$) was then constructed assuming a constant $V_p/V_s$.

Figure 5:
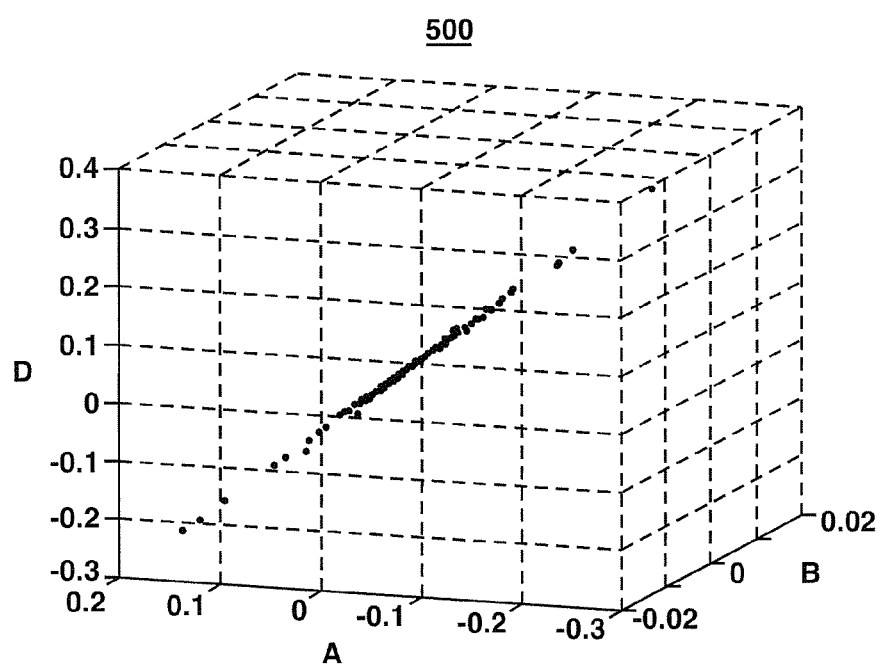
FIG. 5 is a rotated view of the three dimensional scatter-plot of FIG. 4 illustrating the linear relationship of the seismic attributes, in accordance with an exemplary embodiment of the present invention.

Although the data in FIG. 4 appear to be scattered, in reality the data points are aligned along a plane in AVA space as shown in FIG. 5, obtained by reorienting the scatter-plot. The different scales for A and B in FIGS. 4 and 5 are merely due to scaling differences caused by the change in perspective and do not indicate differences in the range of the values. As can be seen in the scatter-plot 500 in FIG. 5, the data points are aligned along a plane in the AVA attribute space. This observation is mathematically governed by the linear relationship between A, B, and D, shown in equation (8), which is derived from equations (1)-(4), and (6).

$$(\gamma+4)A - \gamma B + (\gamma+2)D = 2\frac{\Delta\gamma}{\gamma} \tag{8}$$

For a constant $V_p/V_s$, $\gamma$ is constant and, thus, the right hand side of equation (8) vanishes and the left hand side represents the projection of the AVA data along the plane in AVA attribute space. For a constant $V_p/V_s$, the sum of AVA attributes is defined by the parameterization equation (1), wherein attribute A weighted by $-(1+4/\gamma)$ and attribute B is in phase with the AVA attribute D, as defined in equation (2). Small variations in $V_p/V_s$ may cause points in the AVA attribute space to scatter away from the plane, but still leave the combination of A and B effectively in phase with D. The combination of the AVA attributes A and B of the PP mode data and AVA attribute D of the PS mode data may therefore be effective in aligning PP mode data and PS mode data when changes in $V_p/V_s$ are small.

Other combinations may provide more effective weighting factors under different property conditions for the geological layers. For example, this may occur when variations in $V_p/V_s$ are not insignificant (e.g., larger than 5% between the layers across the reflecting interface), but variations in other properties of the geological layers may be small. For example, two such relations are presented in equations (9) and (10)

$$B - A - D = \frac{\gamma-2}{\gamma^2}\frac{\Delta\mu}{\mu} \tag{9}$$

$$\gamma(B - A) - 2D = -\frac{\gamma-2}{2}\frac{\Delta\rho}{\rho} \tag{10}$$

In equation (9), $\mu$ represents the shear modulus of the geological layers and, in both equations, $\gamma$ represents $V_p/V_s$. Thus, from equation (8), when the high frequency changes in $\gamma$ are negligible, the combination of $\gamma B-(\gamma+4)A$ has the same phase and magnitude as D. From equations (9) and (10), it is apparent that when changes in either $\mu$ or $\rho$ are negligible, the combination B-A is in phase with D.

As discussed with respect to the examples below, numerical experiments with models based on measured well log data suggest that there may be a range of combinations of A and B that satisfies the phase criterion under less stringent conditions on variations of the properties of the geological layers than those implied in Equations (8)-(10). For example, even when the high frequency fluctuations in $\gamma$, $\mu$ or $\rho$ are not negligible, but are within some tolerance, the phase compatibility between the combination of AVA attributes A and B of the PP mode data and the AVA attribute D of the PS mode data may be useful for alignment. Further, using an average $\gamma$ for the combination of A and B shown in equations (8)-(10) may still result in phase compatibility with D. As such, the scattered points in AVA attribute space may not collapse to a plane. A range of combinations of the attributes A and B may be reasonably in phase with the attribute D and, thus, may be effective in the alignment of PP mode data and PS mode data.

The AVA attributes A, B, and D tend to capture near to mid angle information, e.g., information from about 10° to about 40°. However, when the signal to noise ratio of the PS mode data is sufficient at far angles (e.g., from about 40° to about 60°), it may be used to provide a determination of the AVA attribute E of the PS mode data using the parameterization in equation (2). This attribute provides an additional degree of freedom for determining weighting factors. Algebraically eliminating rock properties from the Aki-Richards equations results in the relationship shown in equation (11).

$$B - A = \left(1 - \frac{\gamma-2}{\gamma(\gamma+1)^2}\right)D + \frac{2\gamma(\gamma-2)}{(\gamma+1)^2}E \tag{11}$$

In equation (11), $\gamma$ represents $V_p/V_s$. Unlike the equations (8)-(10), equation (11) does not contain contrasts between properties. Thus, the attribute B-A of the PP mode data should be in phase with the stated combination of D and E of the PS mode data regardless of contrasts in the rock properties. An approximation to equation (11), which is valid for $\gamma$ greater than about 1.4, is presented in equation (12).

$$B - A = D + 2\left(1 - \frac{4}{\gamma+2}\right)E \tag{12}$$

As indicated in equation (12), B-A is in phase with the combination of PS mode AVA attributes D and E, even when $\Delta\mu/\mu$ has significant magnitude, for example, greater than about 0.1. For $\gamma=2$, the E term has no contribution in equation (12) and, consistent with equations (9) and (10), B-A equals D. For values of $\gamma$ in the range of 1 to 5, commonly encountered in rocks, the E component in Equation (12) is always smaller than the D component.

Alternative parameterizations of Aki-Richards equations may be used to express relations of properties of geological layers, such as the parameterization shown in equation (13).

$$r_{pp}(\theta) = A_1 \sec^2\theta + B_1 \sin^2\theta + C_1(\tan^2\theta - \sin^2\theta) \tag{13}$$

The AVA attributes of the PP mode data in equation (13) relate to contrasts between properties of geological layers as presented in equations (14)-(16).

$$A_1 = \frac{\Delta I\rho}{2I\rho} \tag{14}$$

$$B_1 = -\frac{4}{\gamma^2}\frac{\Delta I_s}{I_s} + \left(\frac{4}{\gamma^2} - 1\right)\frac{\Delta\rho}{2\rho} \tag{15}$$

$$C_1 = -\frac{\Delta\rho}{2\rho} \tag{16}$$

In equations (14)-(16), $\gamma$ is the background ratio of P-wave and S-wave velocities (i.e., $V_p/V_s$), $\rho$ represents the density of the rock layers, $I_p$ represents the impedance to P-waves, and $I_s$ represents the impedance to S-waves. Equations (14)-(16) may be used to generate modified versions of equations (8)-(12) for combining the alternative AVA attributes, $A_1$, $B_1$, and $C_1$, for PP/PS alignment. For example equation (12) takes the following simpler form $$B_1 = D + 2\left(1 - \frac{4}{\gamma + 2}\right)E \quad (17)$$

Other parameterizations of the Aki-Richards expressions are also possible. Generally, such parameterizations have the same physics, but may differ in the stability of the calculated AVA attributes.

Figure 6:
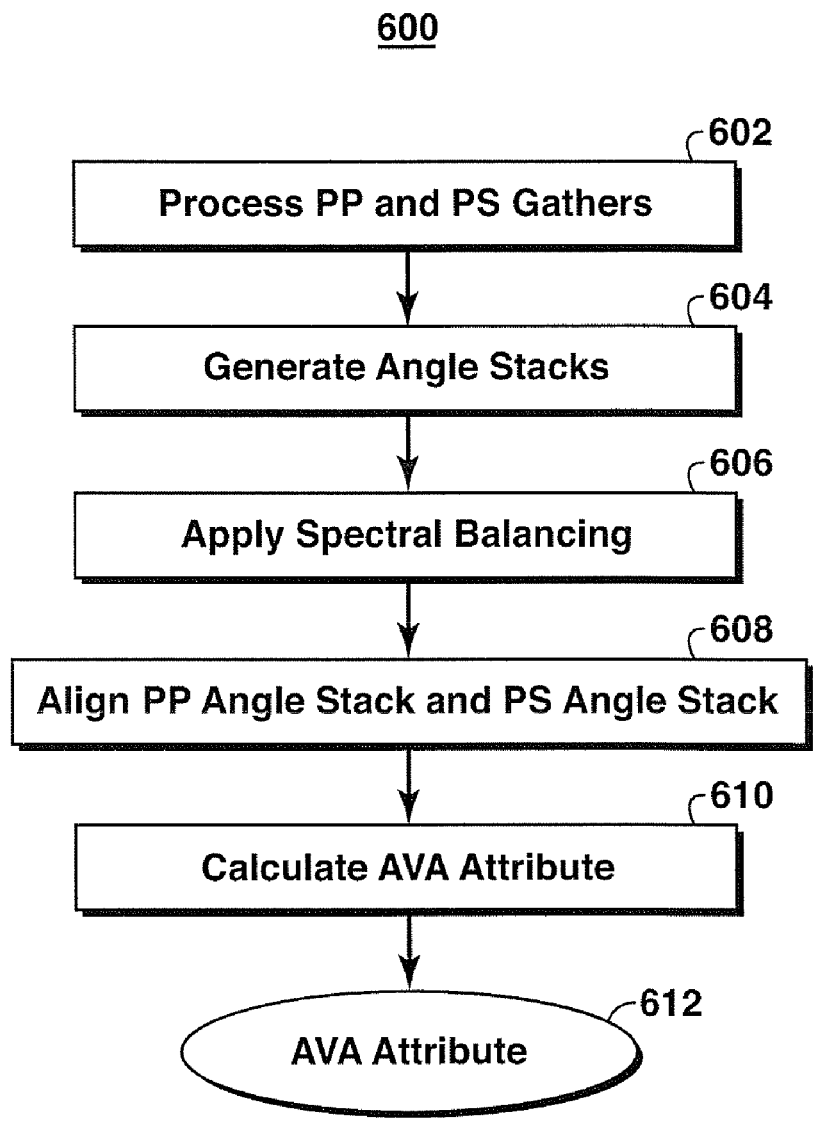
FIG. 6 is a process flow diagram showing a method for analyzing data to determine various seismic attributes, in accordance with at least one exemplary embodiment of the present invention.
Figure 7:
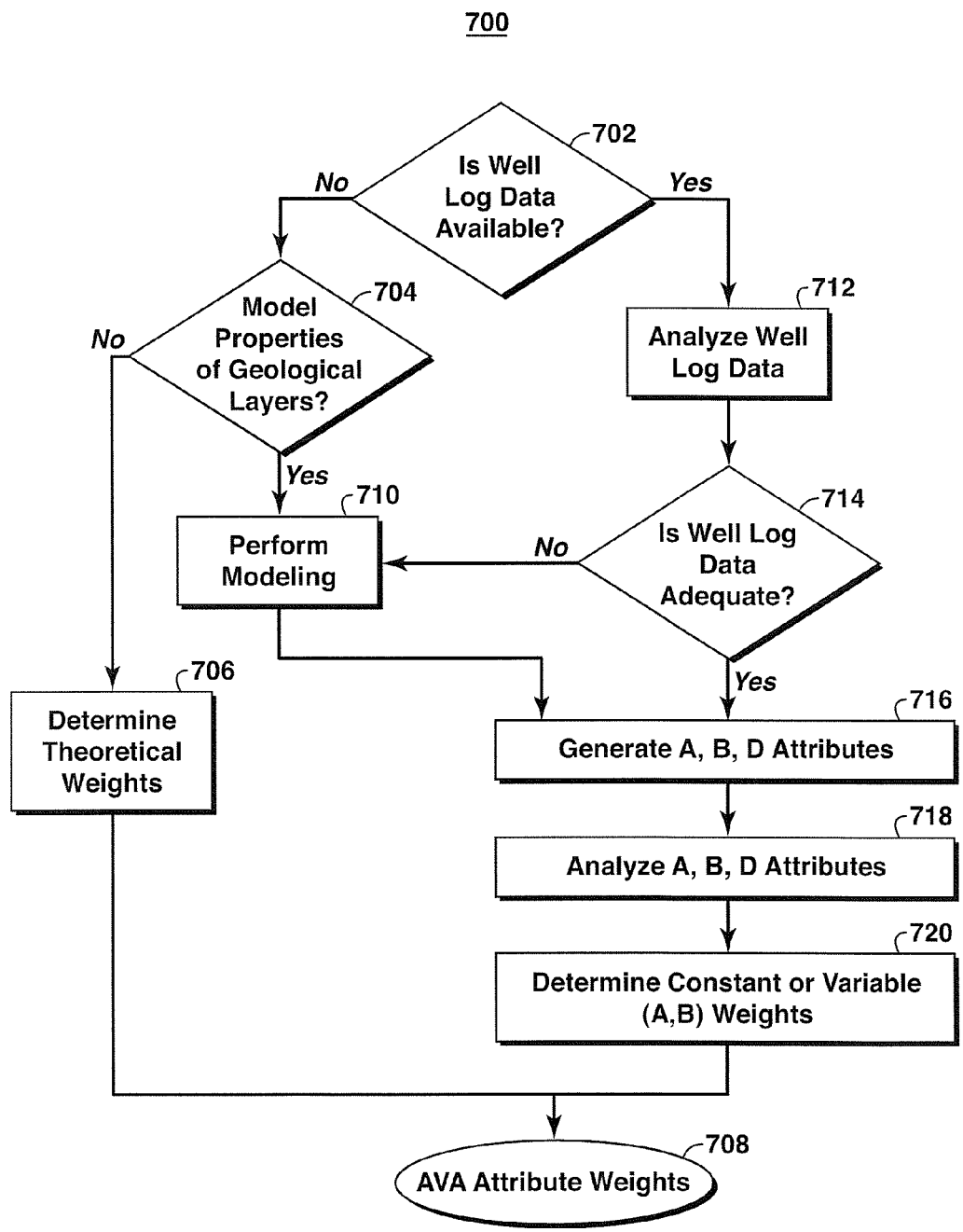
FIG. 7 is a process flow diagram showing a method for generating weighting factors for phase matching of PS mode data with PP mode data, in accordance with at least one exemplary embodiment of the present invention.
Figure 8:
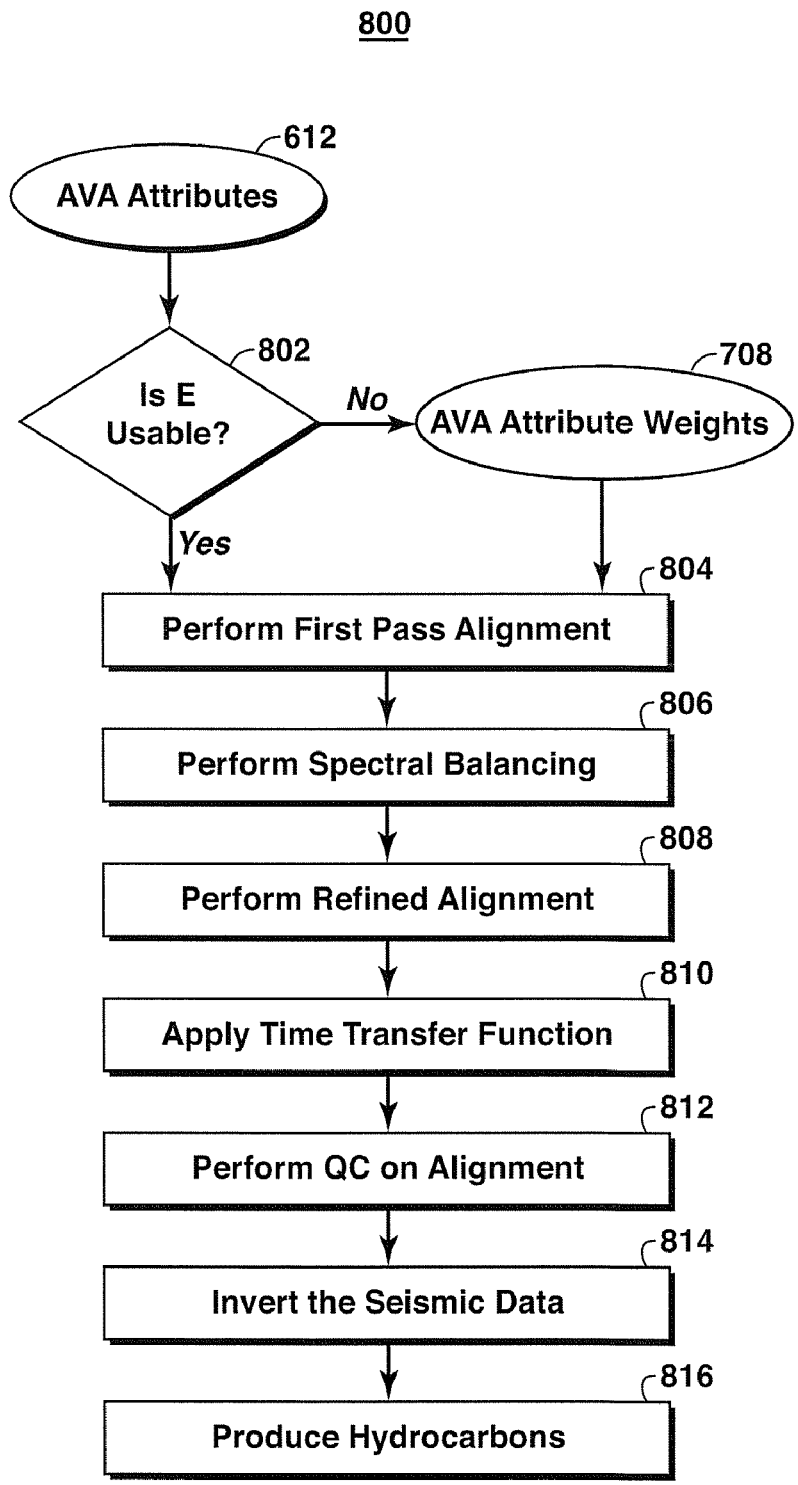
FIG. 8 is a process flow diagram for aligning the PP mode data and PS mode data using the seismic attributes and weighting factors from the processes in FIGS. 6 and 7 in accordance with an exemplary embodiment of the present invention.

The equations detailed above may be used to align PP mode data and PS mode data for seismic analysis. This is described in greater detail with respect to FIGS. 6-8. FIG. 6 describes a method (generally corresponding to block 302) for processing seismic data to generate AVA attributes in preparation for alignment, in accordance with an exemplary embodiment. FIG. 7 describes a method (generally corresponding to block 304) for determining weighting factors for the AVA attributes to be used in the alignment, in accordance with an exemplary embodiment. FIG. 8 describes a method (generally corresponding to block 306) for using the attributes and weighting factors to align the PP mode data and the PS mode data.

FIG. 6 is a process flow diagram showing a method 600 for analyzing data to determine various seismic attributes, in accordance with an exemplary embodiment of the present invention. This method 600 is an example of a possible technique for calculating the AVA attributes, as discussed in block 302 of FIG. 3. The method 600 begins with the processing of the seismic offset data (e.g., offset gathers) having PP mode data and PS mode data, as indicated in block 602. The offset data may be processed using controlled amplitude and controlled phase (CACP) algorithms that are known to practitioners of seismic data processing. However, other techniques may be used instead of or in addition to CACP. For example, the offset data may be processed by depth migration, time migration or may merely be corrected for near move out (NMO) and divergence effects. Regardless of the specific process technique, the multi-component seismic processing generates data volumes for the PP mode data and PS mode data.

In an exemplary embodiment of the present invention, the seismic data volumes may be analyzed as angle stacks. Thus, as seismic volumes may be processed as offset gathers, the offset gathers may be used to generate angle stacks, as indicated in block 604. The conversion of the offset gathers to angle stacks may be performed using ray tracing techniques and known P-wave and S-wave velocities. However, the present techniques are not limited to angle stacks, as any other type of seismic data may be used. For example, the present techniques may be used to align offset gathers, angle gathers, offset stacks, or angle stacks, among others.

In block 606, the angle stacks may be spectrally balanced to compensate for stretch and attenuation effects that are usually unrelated to the properties of interest of the geological layers. This may provide PP and PS mode data having a substantially consistent bandwidth. If this process is applied, it is separately performed for the PP mode data and the PS mode angle stack data. In block 608, the angle stacks in each of the PP mode data and the PS mode data are aligned separately for each mode. This alignment corrects minor time irregularities in the individual angle stacks of the two modes and is distinct from the more substantial alignment of the PS mode data and the PP mode data.

The aligned angle stacks in the PP mode data and in the PS mode data may then be used to calculate the AVA attributes of the PP mode data and the AVA attributes of the PS mode data, as shown in block 610. These AVA attributes may be calculated by the Aki-Richards parameterizations discussed above with respect to equations (1)-(15). The resulting AVA attribute volumes 612 (e.g., PP mode AVA attribute volumes and PS mode AVA attribute volumes) may be used in the process of FIG. 8 discussed below to align the PS mode data with the PP mode data.

FIG. 7 is a process flow diagram showing a method 700 for generating weighting factors for phase matching of the PP mode data and the PS mode data, in accordance with an exemplary embodiment of the present invention. This method 700 illustrates an example of a possible technique for calculating the weighting factors (e.g., AVA attribute weights), as discussed in block 304 of FIG. 3.

The process begins in block 702 with the determination of whether useful well log data (or other physical data) is available for the weighting calculation. If not, in block 704, a decision is made whether to model properties of the geological layers to determine the weighting factors (e.g., to use scenario modeling). If no modeling is to be used, a determination of theoretical weights for the AVA attributes may be made, as shown in block 706. For example, in an exemplary embodiment of the present invention a theoretical weight, or combination, of 2.45A-B for the AVA attributes of the PP mode data may be minimized against the AVA attribute D of the PS mode data. Equations (8)-(10) provide other theoretical weights for matching combinations of AVA attributes A and B of the PP mode data to the AVA attribute D of the PS mode data under different geologic conditions governing the magnitudes of contrasts in $\mu$, $\gamma$, and $\rho$. Generally the phase match between combinations of the A and B attributes with D is fairly robust for alignment purposes over a wide range of weights for A and B, even though magnitudes may not match.

If the determination in block 702 is made that well log data (or physical data) are available, the method 700 proceeds to block 712, in which the well log data is analyzed to determine the properties of the geological layers in the subsurface region. For example, the properties may include $V_p$, $V_s$ and $\rho$ data measured in well log data.

The method 700 then proceeds to block 714 in which a determination is made as to whether the well log data is adequate (i.e., of sufficient quality and contains sufficient range of rock properties) to use for determining the weighting factors. If the well log data is not adequate, or if modeling has been chosen in block 704, in block 710 the modeling of the properties of the geological layers may be performed. For example, 'pseudo-wells' may be generated to represent scenarios of expected properties variations (porosity, v-shale, etc.) over selected portions of a field. The rock physics relations derived in 712 or obtained from other rock properties analyses in the area may then be used to generate $V_p$, $V_s$ and $\rho$ scenarios and generate synthetic seismic data. The synthetic seismic data may then be used for determining the weighting equations for A and B.

Once the properties of the geological layers have been predicted or measured, the AVA attributes A, B, and D may be generated, as indicated in block 716. After generation, the AVA attributes A, B and D may be analyzed, as indicated in block 718. This analysis may involve plotting the AVA attributes against each other in AVA attribute space to form scatter plots, e.g., as discussed with respect to FIGS. 4 and 5.

Then, the scatter plots in AVA attribute space may then be analyzed over selected lateral and vertical space-time windows to identify projections with a low amount of scatter. More sophisticated mathematical techniques that may be useful to determine interrelationships between multi-variate data, such as fitting the data to functions, may be used to analyze the data in addition to or instead of the data plots.

Finally, as indicated in block 720, the analysis in 718 can result in the weights for combining the PP mode data AVA attributes A and B could be constant or spatially and time variable.

Regardless of the specific method for determining the AVA attribute weights, such as block 706 or 720, the AVA attributes weights or weighting factors are the result, as shown in block 708. Once the AVA attributes and AVA attribute weights have been determined, these values may be used to determine the refined alignment.

FIG. 8 is a diagram of a process 800 (corresponding to a portion of block 306 of FIG. 3) for aligning the PP mode data and PS mode data using the AVA attributes and weighting factors from the processes in FIGS. 6 and 7, in accordance with an exemplary embodiment of the present invention.

The method 800 begins in block 802 with a qualitative assessment of the reliability of the AVA attribute E from the PS mode data. If the AVA attribute E is deemed useable, then the AVA attributes A, B, D, and E (e.g., the AVA attribute volumes) may be used for the alignment without calculating the AVA attribute weights 708. Accordingly, steps in block 804 through 812 described below may be performed without the AVA attribute weights 708 by using equation (12) with an initial estimate of the background ratio between the P-wave and S-wave velocities, $V_p/V_s$ (or $\gamma$). If E is not usable, the AVA attribute weights 708 may be used to align the attribute volume(s) (e.g., the PP mode data and the PS mode data) in blocks 804 through 812, as described below.

Furthermore, the value for $\gamma$ may be iteratively refined by successively repeating the blocks in the methods shown in FIGS. 7 and 8, wherein the value for $\gamma$ from the previously iteration is incorporated in block 804 for the calculation of the AVA attribute weights in the next iteration. Iteration may be especially useful when using AVA attribute E for the alignment, because the weights in this approach E may be much more sensitive to the background variations in $\gamma$ ($V_p/V_s$) than the weights using (A, B, D) attributes. Further, iteration may also be used for alignment using AVA attributes with theoretically derived weights that depend upon background $V_p/V_s$ ratio. For example, the time transfer function may be used to calculate $V_p/V_s$ ratio at the end of a given iteration and the ratio may then be used in calculating the theoretical weights for the next iteration. The iteration process is stopped when the incremental time difference is within some tolerance.

As shown in block 804, a first pass alignment is performed. The first pass alignment accounts for the gross differences in PP times and PS times. A number of techniques may be used to perform this first pass alignment. For example, the first pass alignment may be performed by a horizon keyed alignment, as discussed with respect to FIG. 3. Other techniques that may be used in embodiments include alignment using a constant estimate of the $V_p/V_s$ ratio, alignment using a time varying function for the $V_p/V_s$ ratio, and alignment using a $V_p/V_s$ volume. The first pass alignment "squeezes" the PS mode data attribute volume, e.g., by shifting the time values to roughly match the time values of the PP mode data attribute volume.

After the first pass alignment, the resulting PS mode AVA attributes may have wavelet distortions and, thus, may have a different overall bandwidth from the bandwidth of the PP mode AVA attributes. To compensate, a spectral balancing technique may be performed in block 806. To spectrally balance the AVA attributes, the PP mode AVA attributes and PS mode AVA attributes from the aligned attribute volume are transformed from time domain to frequency domain, such as by a Fourier transform, among others. For example, using a Fourier transform, the angle stacks of the PP mode data and the angle stacks of the PS mode data may be transformed into the frequency domain. In the frequency domain, a conversion function is derived, e.g., a shaping filter, that when applied to either the PS mode data volume or alternatively to PP mode data volume results in substantially minimizing the error between the frequency spectrum of the PS mode data volume and the PP mode data volume. The resulting shaped PS mode or PP mode data volume is then converted back to the time domain using an inverse Fourier transform. After this processing, the resulting PS mode data volume has approximately the same bandwidth as the PP mode data volume. The convolution function obtained may be used for spectral balancing the PS mode AVA attribute volumes, by transforming the AVA attribute volumes, processing the data volumes with the function, and then performing an inverse transformation. Alternatively, a convolutional function may be derived using combinations of the PS mode and PP mode AVA attribute volumes.

In block 808, the first pass alignment is refined. This may be performed by using an error minimization function to adjust the time values of the spectrally balanced AVA attributes of the PS mode data to maximize the match to the AVA attributes of the PP mode data. For example, an error minimization calculation could adjust the time values of the spectrally balanced D attribute data to minimize the errors between the D attribute and the weighted combination of PP mode attributes A and B. This process typically requires resampling at the time samples when the adjusted time values of PS mode data are between the time samples in the data volume. The changes made to the time values of the AVA attribute D constitute a second time transfer function that may then be used to adjust the time values of the first-pass aligned PS mode data to match the time values of the PP mode data, as indicated in block 810.

In block 812, the sufficiency of the refined alignment may be evaluated. For many applications, a visual inspection of the PS mode data plotted against the PP mode data will suffice. However, when well log data are available, the well log data may be used to assess the alignment, e.g., by comparing the predicted properties for PS mode data at a particular depth with the actual properties from the well log data at that depth. If the quality of the match is deemed to be sufficient, the time transfer function generated may be used to shift other types of PS mode data to match the times of the PP mode data. For example, if an inversion has been performed on the PS mode data, the inverted data may be mapped to match the times of the PP mode data using the time transfer function.

If the seismic data has been depth migrated prior to alignment, it may not be necessary to perform the first pass alignment. For example, if the depth migration used accurate compressional and shear migration velocities, they may have a good initial alignment and may only require the refined alignment. However, if the visual review of the quality of the alignment of the depth migrated PS mode data with the PP mode data shows large low-frequency alignment errors, the full alignment procedure described may be preferred.

A useful outcome of refined alignment in an embodiment of the present invention is an estimate of low-frequency average $V_p/V_s$ ratio, or $\gamma_{avg}$, obtained from the ratio of PS times to PP times in the aligned data at each PP time sample. The function $\gamma_{avg}$ may be converted to low frequency component of interval $V_p/V_s$, or $\gamma_{int}$, using techniques known in the art of joint PP/PS analysis (Gaiser, *Geophysics* 61, 1137-1149 (1990)) and $\gamma_{int}$ may be used in inversion of joint PP/PS data after enhanced alignment, as described below.

The aligned seismic data may then be inverted to generate a data representation of a subsurface location, as indicated in block 814. The data representation, or image, may be used to predict a subsurface location for a hydrocarbon reservoir. In block 816, hydrocarbons may be produced from the predicted subsurface location.

Many techniques for joint inversion of PP mode and PS mode data are used in the published art of joint PP/PS analysis. Examples of such techniques are Debeye et al., "$L_p$-Norm Deconvolution," *Geophysical Prospecting* 4, 381-403 (1990); Contreras et al. *Geophysics* 72, C21-C29 (2007); Jing, "SVD based techniques," $74^{th}$ *Ann. Internat. Mtg., Soc. Expl. Geophys., Expanded Abstracts*, 897-900 (2004); two other SVD references: Mahamoudian, M. S. Thesis, Dept. of Geology and Geophysics, University of Calgary (2006), and Veire, H. H., and Landro M., *Geophysics* page R1 (2006); and Garotta et al., "Combined Interpretation of PP and PS Data Provides Direct Access to Elastic Rock Properties," *The Leading Edge*, 532-535 (2002). Typical results of joint inversion are estimates of geophysical parameters P-wave impedance, S-wave impedance, and density and/or their combinations. At the well locations, the inversion results are calibrated with well log derived subsurface properties such as shale volume, porosity, pressure, and fluid saturation. The calibration models are then applied to predict subsurface properties over survey areas of interest for reservoir characterization and for monitoring fluid movement and pressure changes during hydrocarbon production cycle. Reservoir monitoring may be done using 4D seismic techniques with specially designed repeat seismic surveys. This patent document discloses a new joint PP/PS inversion method using simple combinations of PP mode and PS mode AVA attributes. These combinations include those given in Equations (8)-(10) that were used to guide PP-mode and PS-mode data alignment. After refined alignment, PP mode and PS mode AVA attributes may be combined in the present invention according to Equations (8)-(10) to get band-limited estimated of $V_p/V_s$ ratio $\gamma$, shear wave modulus $\mu$, and density $\rho$. In doing so, background $\gamma$ in Equations (8)-(10) may be approximated by low-frequency $\gamma_{int}$ calculated from $\gamma_{avg}$ to yield $$(\gamma_{int} + 4)A - \gamma_{int}B + (\gamma_{int} + 2)D = 2\frac{\Delta\gamma}{\gamma} \qquad (18)$$

$$B - A - D = \frac{\gamma_{int} - 2}{\gamma_{int}^2} \frac{\Delta\mu}{\mu} \qquad (19)$$

$$\gamma_{int}(B - A) - 2D = -\frac{\gamma_{int} - 2}{2} \frac{\Delta\rho}{\rho} \qquad (20)$$

The (A, B, D) combination in Equation (18) gives a band-limited estimate of $\gamma$ which may be associated with changes in subsurface lithology, reservoir fluids and/or reservoir pressure. Similarly Equation (19) gives joint band-limited inversion of shear wave modulus $\mu$ which is generally independent of reservoir fluids and may be associated with changes in subsurface lithology and/or reservoir pressure. Equation (20) gives band-limited inversion of density $\rho$. The estimates of shear wave modulus and density in these equations have time varying scaling factors that depend on low-frequency $\gamma_{int}$.

Equations (18)-(20) may also be combined to estimate band limited shear wave impedance as follows $$\gamma_{int}(B - A) - (\gamma_{int} + 2)D = 2\frac{\Delta Is}{Is} \qquad (21)$$

Inversions based on Equations (18)-(21) use only three joint PP mode and PS mode AVA attributes (A, B, D) which are most reliably extracted in joint PP/PS AVA analysis. Inversion results may be improved by incorporating AVA attributes C and E when seismic data quality reliably allows their estimates. These inversion alternatives may involve a set of four AVA attributes (A, B, D and E), or a sets of all five AVA attributes (A, B, C, D and E). The PS mode AVA attribute E may be more reliably estimated in joint AVA analysis than the PP mode AVA attribute C. The four-attribute set extension of joint AVA inversion using (A,B,D, and E) may often be more practical than the five-attribute set extension. In either case, from Equations (3)-(7) the joint inversion problem for estimating ($I_p$, $\mu$, and $\rho$) may be set as follows $$P = Gm \qquad (22)$$

where m is the vector of geophysical parameter set ($I_p$, $\mu$, and $\rho$) and P is vector either of four AVA attributes (A, B, D, E) or of five attributes (A, B, C, D, E). Accordingly, for a four-attribute set inversion of ($I_p$, $\mu$, and $\rho$) G in Equation (22) may be expressed as $$G_{4 \times 3} = \begin{bmatrix} 0.5 & 0 & 0. \\ 0.5 & -2/\gamma_{int}^2 & -0.5 \\ 0 & -2\_/\gamma_{int} & -0.5 \\ 0 & (\gamma_{int} + 2)/2\gamma_{int}^2 & -1/4\gamma_{int}^2 \end{bmatrix}; \qquad (23)$$

and for a five-attribute set inversion of ($I_p$, $\mu$, and $\rho$) the matrix G in Equation (22) may be expressed as $$G_{5 \times 3} = \begin{bmatrix} 0.5 & 0 & 0. \\ 0.5 & -2/\gamma_{int}^2 & -0.5 \\ 0.5 & 0 & -0.5 \\ 0 & -1/\gamma_{int}^2 & -0.5 \\ 0 & (\gamma_{int} + 2/\gamma_{int}^2 & -1/4\gamma_{int}^2 \end{bmatrix}; \qquad (24)$$

In either the four-attribute extension or the five-attribute extension, the inversion problem is an over-determined problem, in that we have a larger number of AVA attributes (four or five) than the three geophysical parameters (for example, $I_p$, $I_s$, and $\rho$). This over-determined inversion may be solved by the known SVD technique (Jing, op. cit.) applied to system of equations 22 and 23, or equations 22 and 24.

The simple attribute combinations in equations 18 and 19 may be especially beneficial in reservoir monitoring using 4D seismic. This is because in the duration between the base and the monitor surveys, fluid movement and reservoir pressure changes are primary subsurface changes. Specifically, effects such as subsurface structure, lithology, and stratigraphy remains relatively invariant. Differences in the inversion results from base and monitor surveys in 4D seismic may therefore be more directly related to changes in pressure and fluid saturation in intervening time between the base and the monitor surveys. To quantify pressure and fluid saturation changes, PP-mode and PS-mode AVA attributes analysis as disclosed herein may be separately performed on the base and the monitor survey for PP/PS alignment and band-limited joint inversion of subsurface layer properties. Further, these band-limited inversion results of the layer properties from the base and the monitor surveys may be aligned using known techniques in the art of 4D seismic analysis. The differences in inversion results from the 4D-aligned base survey and the monitor survey may then be used to interpret changes in pressure and fluid saturation. Specifically, in 4D seismic, changes in the data volume for the band-limited shear wave modulus, μ, do not depend upon fluids and exclusively depend on pressure changes. The changes in band-limited $V_p/V_s$, or γ volumes, by contrast, may be related primarily to changes fluid saturation.

EXAMPLES

Simulated seismic data (e.g., simulated or synthesized data) obtained from well log data were used to test the method for aligning PP mode data and PS mode data described herein, in two scenarios, the first assuming a constant $V_p/V_s$, and the second assuming a variable $V_p/V_s$. In the first scenario, wherein the value for $V_p/V_s$ was assumed to be constant, the AVA attributes in the attribute volume were derived from well log data that had measured compressional wave velocity, $V_p$, and density, ρ. The shear wave velocity, $V_s$, was calculated from $V_p$ assuming a constant ratio of $V_p/V_s=2$. The AVA attributes A, B, and D were calculated in depth (time) volumes from equations (3), (4) and (6) from a combination of the available seismic data, e.g., from the well log data. For this simple $V_p/V_s$ scenario, equation (8) provides the relation 3A−B+2D=0, which is equal to a plane in A, B, and D attribute space, as shown in FIG. 5.

As such, points in the A, B, and D attribute space should therefore lie in this plane when PP mode data and PS mode data are perfectly aligned. Seen from an arbitrary orientation in three-dimensional A, B, and D attribute space, the points display a scatter, e.g., as shown in FIG. 4. The scatter disappears for a viewing direction tangential to the plane as shown in FIG. 5.

Thus, when $V_p/V_s=2$, the PP attribute volume 3A-B is a good basis to align with PS mode attribute volume for attribute D to generate the time transfer function for registering the PS mode data with the PP mode data. It should be noted that only the phase of the combined PP mode attribute data, 3A-B, needs to be correlated to the PS mode attribute volume for attribute D, not the magnitude. Accordingly, other combinations of A and B may be aligned with D even when $V_p/V_s$ is not constant.

Figure 9:
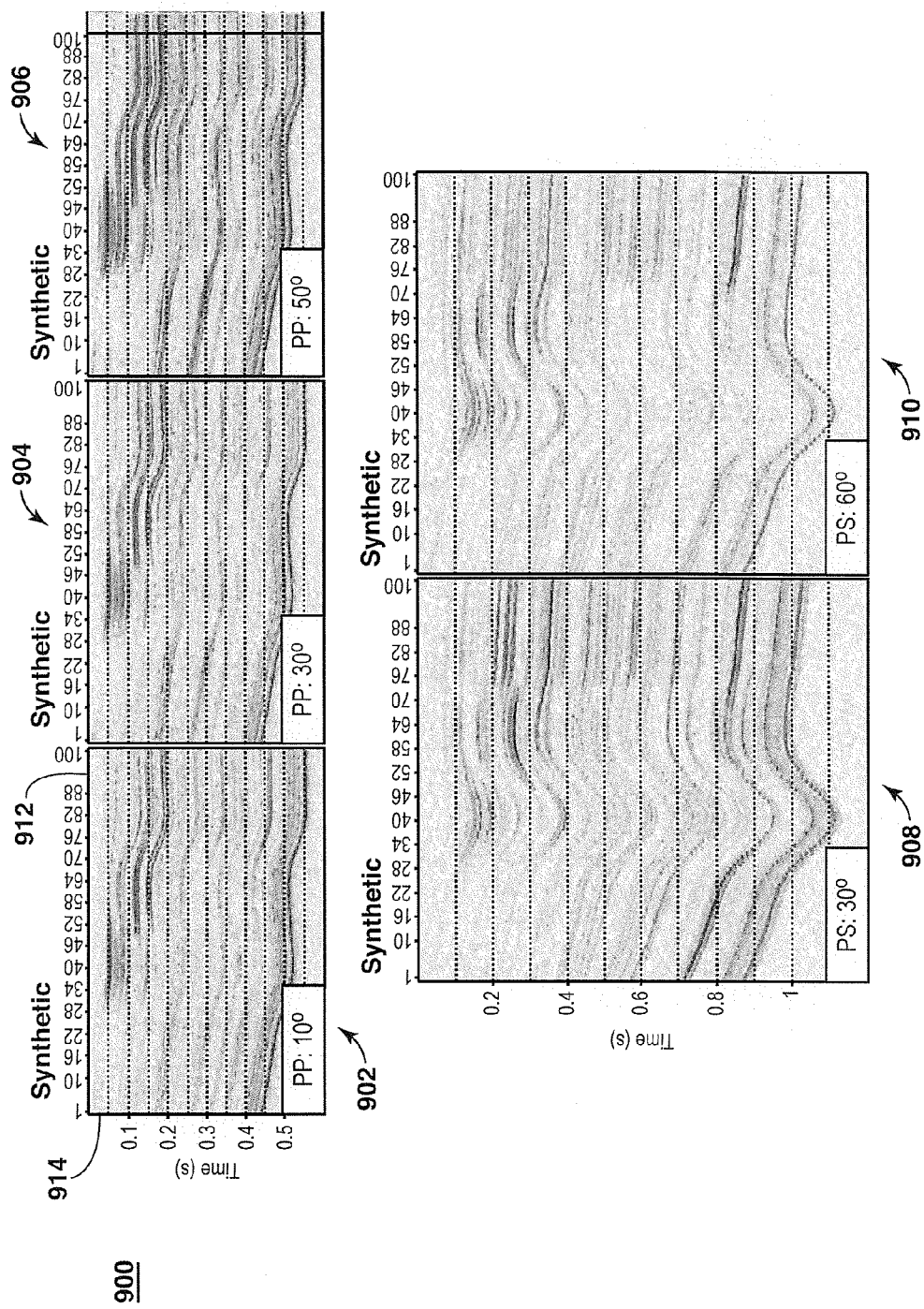
FIG. 9 is a drawing of synthetic, or simulated, charts of PP mode data and PS mode data for different angle synthetic, e.g., PP mode data at 10°, 30°, and 50°, and PS mode data at 30°, and 60°.

The second scenario is based on the assumption that the $V_p/V_s$ is not constant. In this scenario, the methods described in FIGS. 6-8 were used to align the synthetic PS mode data with synthetic PP mode data. FIG. 9 is a drawing of synthetic, or simulated, charts of PP mode data and PS mode data for different angles, e.g., PP mode data at 10° 902, 30° 904, and 50° 906, and PS mode data at 30° 908, and 60° 910. The charts 902-910 are created from a two-dimensional model generated by extrapolating $V_p$, $V_s$, and ρ from four wells in an area and used convolutional seismic modeling with Aki-Richards reflectivity equations (1) and (2). It should be noted that, in contrast to measured angle stacks, the synthetic seismic data do not include a range of angles, but are generated for the actual angle listed. In these charts, the synthetic seismic data are potted against trace number 912 and time 914. The trace number 912 generally represents the lateral distance along the surface from the seismic source. The time 914 generally represents the two-way travel time that the wave took to return to the surface along a vertical travel path and, thus, may depends upon depth and the velocities of the P-waves and S-waves. Further, each trace along a specific trace number 912 represents seismic data where the seismic amplitude at a particular point represented by the darkness of the image. Accordingly, each chart 902-910 may represent a two dimensional image of the properties of the geological layers in the subsurface region.

Using the synthetic seismic data represented by the charts, the AVA attributes A, B, and D are calculated from the synthetic angle stacks of the PP mode data and the PS mode data. Using interpreted horizons in the AVA attributes of the PP mode data and the PS mode data, a first pass alignment of the AVA attributes A and B with the AVA attribute D was performed, generating a time-transfer function (e.g., the first time transfer function). Application of the time-transfer function to the time values of the PS mode data resulted in a coarse first pass alignment with the time values of the PP mode data.

Figure 10:
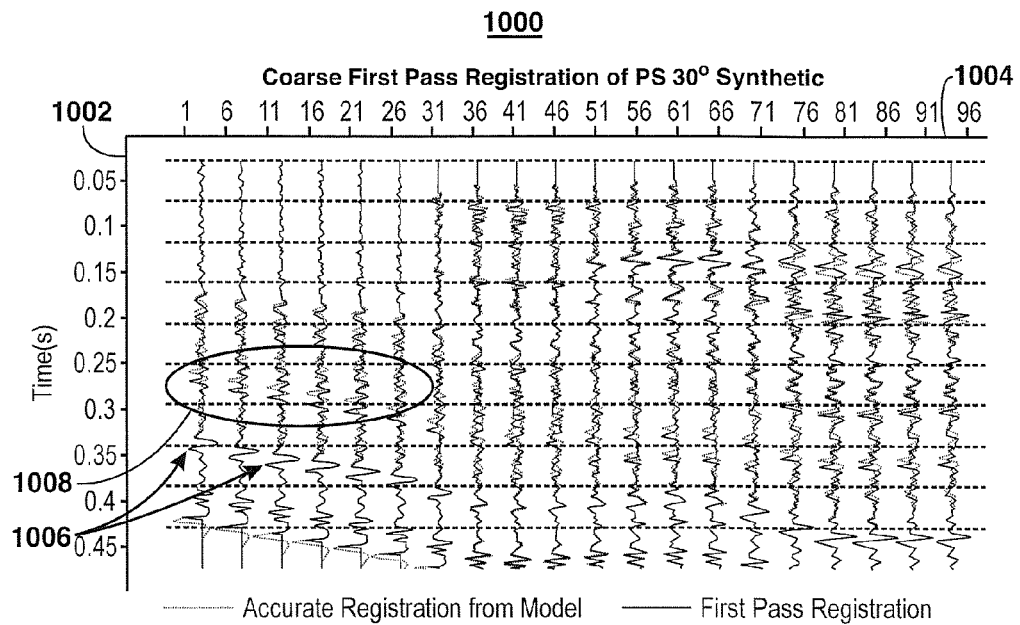
FIG. 10 is a drawing of the results of a coarse first pass alignment of the 30° angle stack of the PS mode data using horizons interpreted on 30° angles synthetic of PP mode data and 30° angle synthetic of PS mode data, in accordance with an exemplary embodiment of the present invention.

FIG. 10 is a drawing of the results of the coarse first pass alignment of the 30° PS mode synthetics. The first pass alignment was performed by aligning horizons interpreted in the 30° PS mode synthetics with horizons in the 30° PP mode synthetics. As for the charts in FIG. 9, the trace numbers 1004 represent the lateral distance along the surface from the seismic source, while the time 1002 represents the two-way travel time the elastic wave took to return to the surface, which, depending on velocities, may represent the depth below the surface of the ground. However, in contrast to the charts in FIG. 9, FIG. 10 shows the individual wiggle trace responses at each trace number 1004. No spectral balancing was needed for these synthetic seismic data and, thus, was not performed.

At points 1006 in the vicinity of horizons used to guide first-pass alignment, the coarse first-pass alignment of the PS 30° synthetics (indicated by the solid line) matched the perfectly aligned PS 30° synthetics (indicated by the dotted line), as expected. However, in the interpolated areas 1008, the alignment was less accurate. The combination of 2.45A-B was then used for the weighting of the PP mode attribute data, using an average value of 2.75 for γ in equation (8). The first-pass aligned PS mode attribute D was then aligned with this combination of PP mode attributes A and B. Generally, the alignment was performed using an error minimization function to shift the time of the D data until a closest match (minimum error) was obtained. After time shifting, the synthetic seismic data did not have regular time spacing between points and was processed to interpolate to regularly spaced points. The resulting time transfer function was then applied to the first pass PS angle synthetics.

Figure 11:
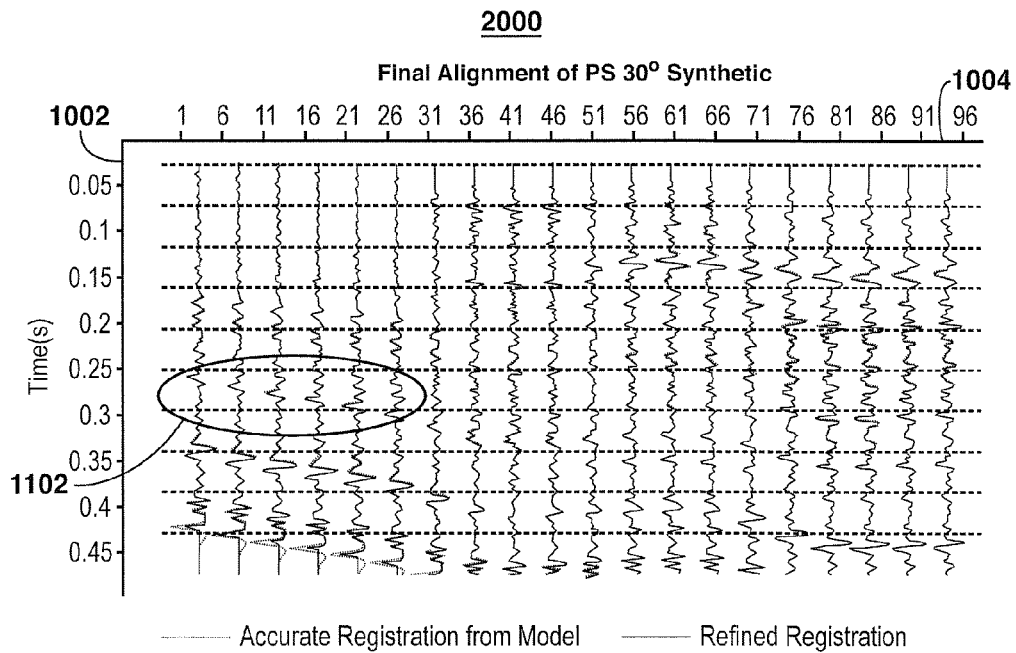
FIG. 11 is a drawing of a refined alignment performed on the first pass alignment of the 30° angle synthetic of the PS mode data, in accordance with an exemplary embodiment of the present invention.

FIG. 11 is a drawing of the final alignment of the 30° PS mode synthetics, in accordance with an exemplary embodiment of the present invention. In this chart, the two-way travel time 1002 and trace number 1004 are defined as in FIG. 10. In comparison to the results for the first-pass alignment 1008, as shown in FIG. 10, the alignment 1102 is more accurate (i.e., the dotted line and the solid line are more coincidental), illustrating the usefulness of the techniques. After a combined first-pass and refined alignment has been performed to obtain the final alignment by the present techniques, the remaining scatter in the cross plots between PP mode AVA attributes and PS mode AVA attributes may be due to variations in the physical properties of the geological layers. This is illustrated in the two dimensional plots of the combinations of PP mode AVA attributes A and B and PS mode AVA attribute data D, after alignment, shown in FIGS. 12 and 13.

Figure 12:
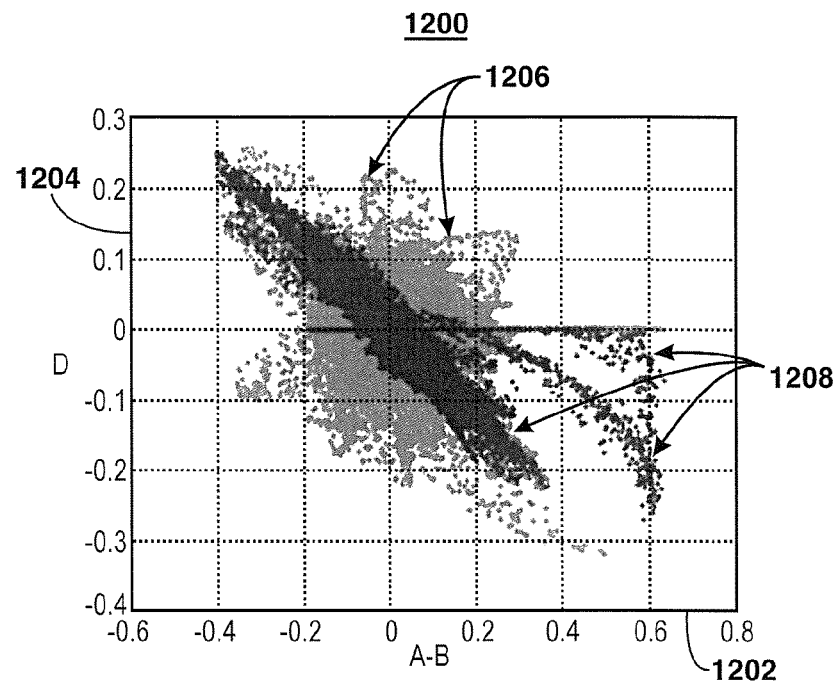
FIG. 12 is a drawing that illustrates relationships between seismic attributes after alignment, in accordance with an exemplary embodiment of the present invention.

FIG. 12 is a drawing that illustrates relationships between seismic attributes after alignment, in accordance with an exemplary embodiment of the present invention. In this figure, a weighting factor of A-B was used for the PP mode attribute volumes, which are charted along the x-axis 1202. This is plotted against finally aligned PS mode attribute volumes for D, which are charted along the y-axis 1204. The light gray region 1206 illustrates the attribute volumes after the first pass alignment, e.g., horizon-keyed alignment as defined above. The first pass aligned attribute volumes 1206 show significant scatter across the plot. By comparison, the attribute volumes aligned using the combined first-pass and refined alignment procedures defined above is shown in the dark grey region 1208. After the refined alignment, the attribute volumes 1208 are more tightly grouped along a line. The scatter in the plotted attribute volumes after alignment illustrates differences in responses in the PP mode data and the PS mode data caused by changes in shear modulus in the geological layers. This relationship is shown in equation (19).

Figure 13:
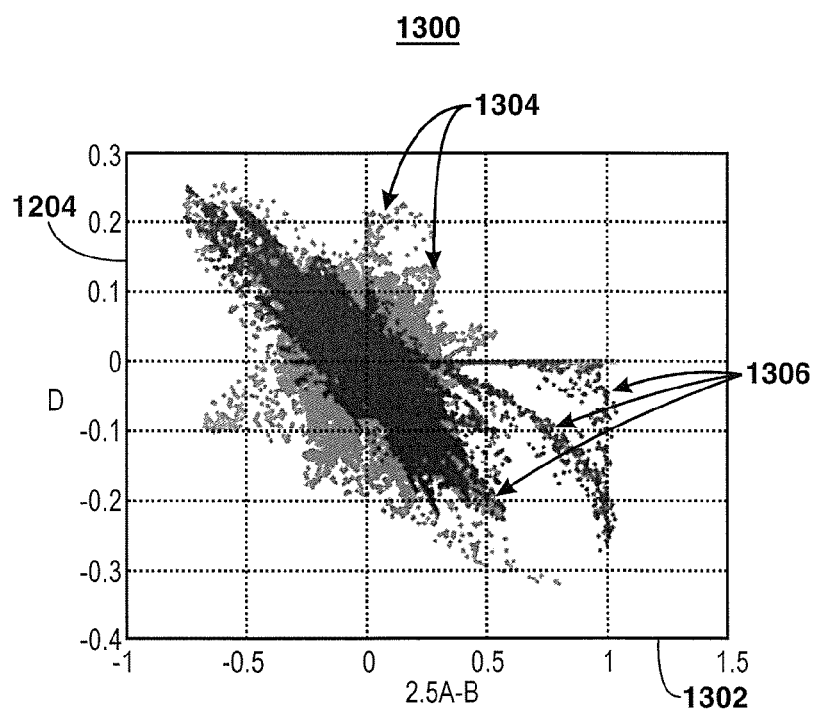
FIG. 13 is a drawing that illustrates relationships between seismic attributes after alignment, in accordance with an exemplary embodiment of the present invention.

FIG. 13 is another drawing that illustrates relationships between seismic attributes after alignment, in accordance with an exemplary embodiment of the present invention. In this figure, a weighting factor of 2.45A-B was used for the PP mode attribute volumes, which are charted along the x-axis 1302. This is plotted against the PS mode attribute volumes for D, which are charted along the y-axis 1204 (as defined in FIG. 12). The light gray region 1304 again illustrates the attribute volumes after a first-pass (e.g., horizon-keyed) alignment. The attribute volumes aligned using the combined first-pass and refined alignment from the present techniques, as shown in the dark grey region 1306, are more tightly grouped along a line. In this chart, the scatter in the attribute volumes after alignment illustrate differences in responses in the PP mode data and the PS mode data caused by changes in $\gamma$ (or, $V_p/V_s$) ratio in the geological layers. This relationship is generally expressed in equation (25), which is derived from equation (18)

$$(1 + 4/\gamma_{int})A - B + (1 + 2/\gamma_{int})D = 2\frac{\Delta\gamma}{\gamma_{int}^2} \tag{25}$$

In both FIGS. 12 and 13, it is apparent the seismic attributes aligned only by horizons has too much scatter due to misalignment and may be unreliable for interpreting rock property variations.

Figure 14:
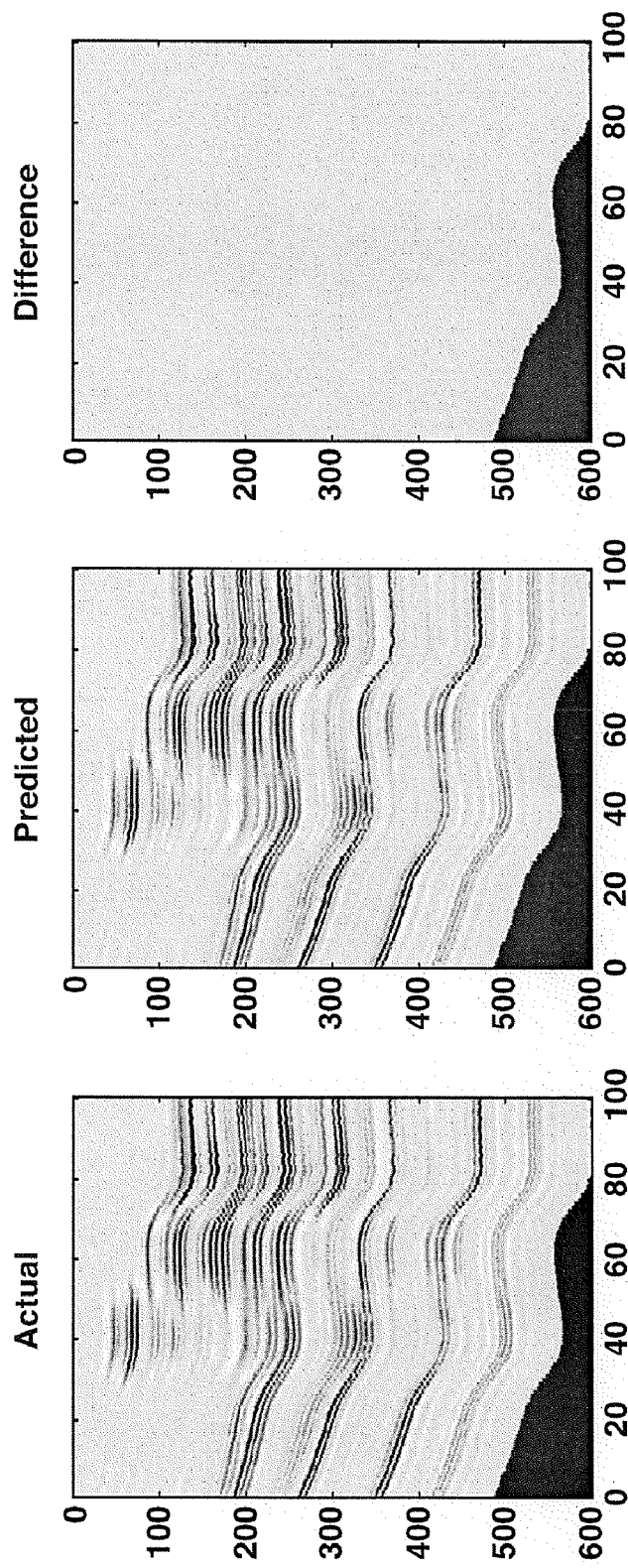
FIGS. 14-16 show the results of the present invention's AVA based joint seismic inversion of perfectly aligned PP and PS angle synthetics, wherein the resulting band-limited $V_p/V_s$ ratio (FIG. 14), band-limited S-wave impedance (FIG. 15), and band-limited density (FIG. 16) are compared with their known values in the model.
Figure 15:
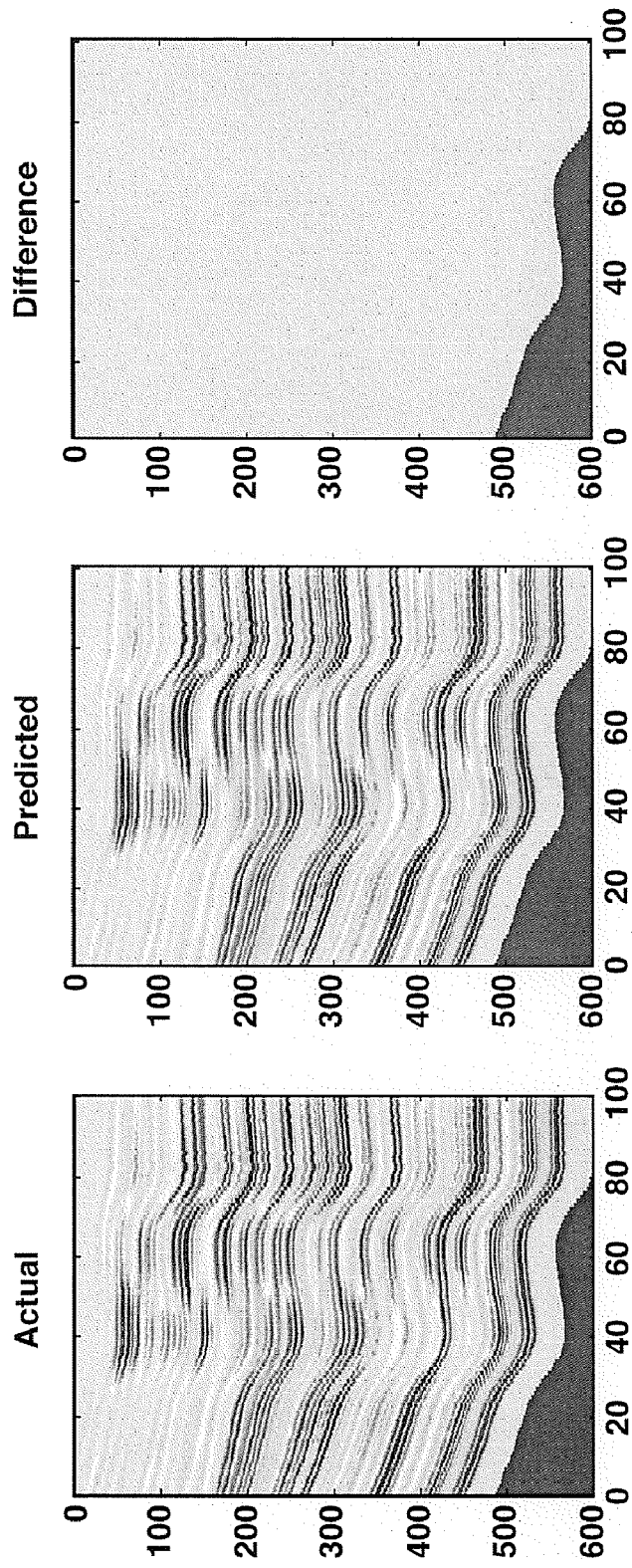
Figure 16:
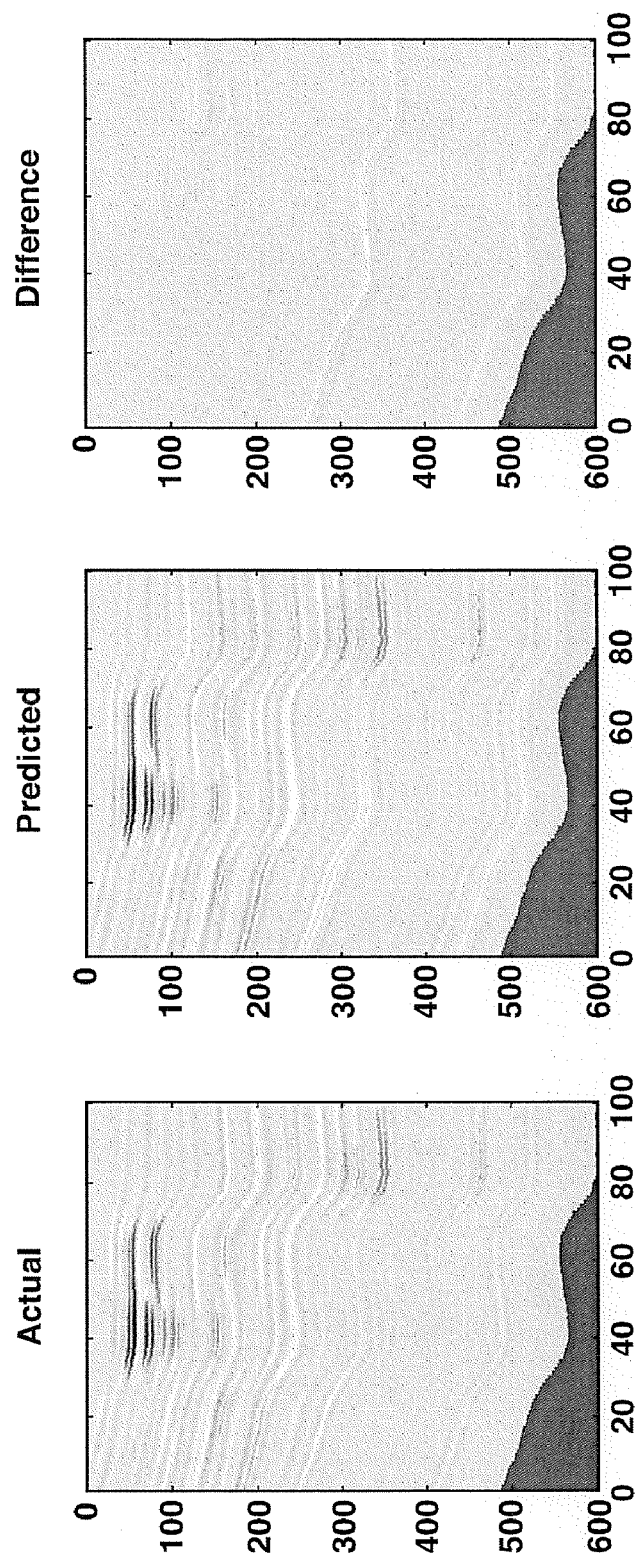

FIGS. (14)-(16) are comparisons of results of inversion based an AVA attributes of the present invention, using Equations (18)-(21) at a trace location in the 2D model when the PS data is perfectly aligned with PP data. Each of these figures shows charts of actual modeled values, predicted values from our AVA based inversion and the difference between actual and predicted values. This perfect alignment was simulated by generating 30° and 60° PS mode angel synthetics in PP-mode travel time, similar to those shown in PS time in FIG. 9, using a convolutional model and PS mode Aki-Richards reflectivity. Perfectly aligned PS mode AVA attributes B and D were then generated from these PS mode angle synthetics and used to invert for band-limited density, band-limited S-wave impedance, and band-limited $V_p/V_s$ using Equations 20, 21, and 22 respectively. When PS mode AVA attribute D is perfectly aligned with PP mode AVA attributes A and B, AVA-based inversion results for band-limited $V_p/V_s$ and band-limited S-wave impedance in FIGS. 14 and 15 respectively are extremely accurate and the difference between prediction and modeled value of these quantities is negligible. Band-limited density predictions in FIG. 16 also have correct lateral variations. However the difference plot shows some variations which may be significant in certain situations. A more accurate density inversion may be obtained by using the 4-attribute or 5-attribute extension of AVA-based inversion embodied in Equations 23 and 24, respectively.

Figure 17:
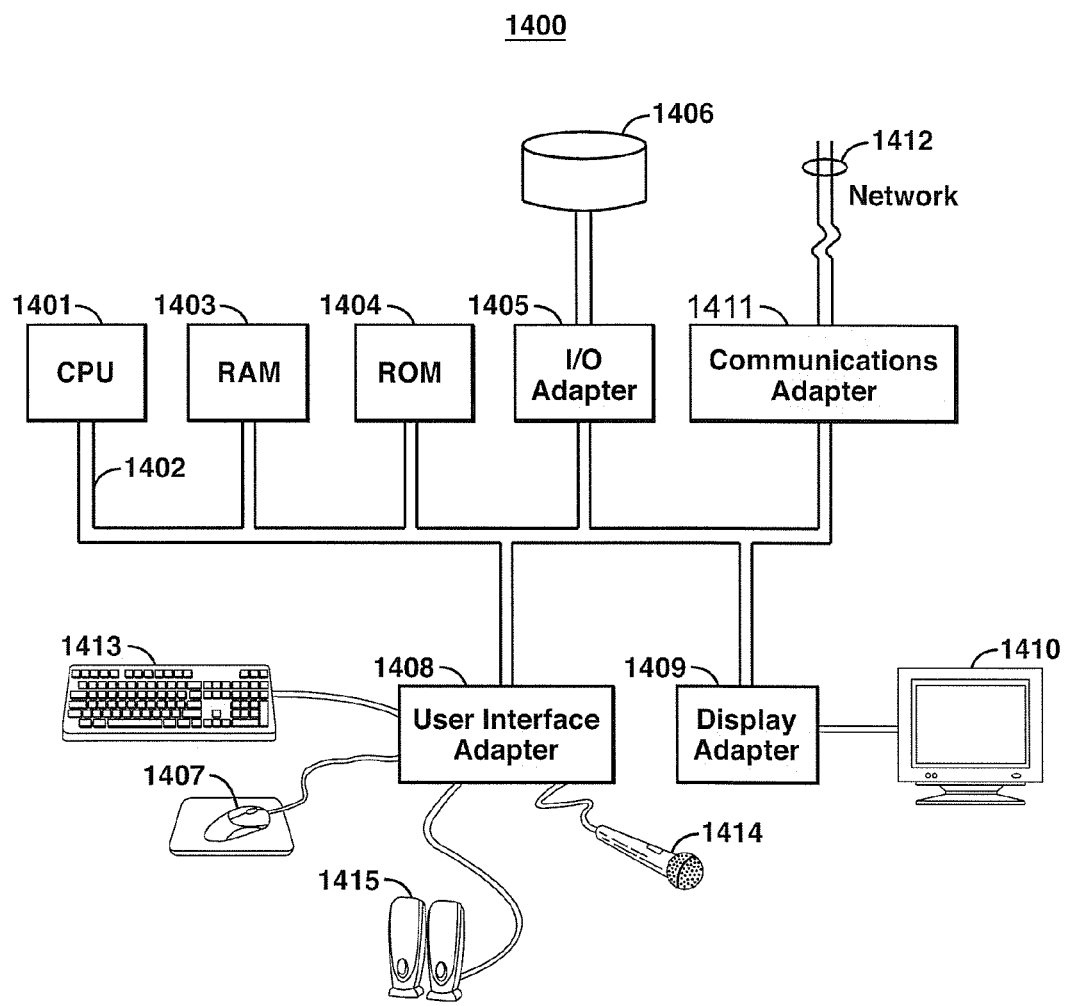
FIG. 17 is a drawing of a computer system which may be used to implement exemplary embodiments of the present invention.

The techniques discussed herein may be implemented on a computing device, such as that illustrated in FIG. 17. FIG. 17 illustrates an exemplary computer system 1400 on which software for performing processing operations of embodiments of the present invention may be implemented. A central processing unit (CPU) 1401 is coupled to a system bus 1402. In embodiments, the CPU 1401 may be any general-purpose CPU. The present invention is not restricted by the architecture of CPU 1401 (or other components of exemplary system 1400) as long as the CPU 1401 (and other components of system 1400) supports the inventive operations as described herein. The CPU 1401 may execute the various logical instructions according to embodiments. For example, the CPU 1401 may execute machine-level instructions for performing processing according to the exemplary operational flow described above in conjunction with FIG. 3. As a specific example, the CPU 1401 may execute machine-level instructions for performing operational block 808 of FIG. 8.

The computer system 1400 also preferably includes random access memory (RAM) 1403, which may be SRAM, DRAM, SDRAM, or the like. The computer system 1400 preferably includes read-only memory (ROM) 1404 which may be PROM, EPROM, EEPROM, or the like. The RAM 1403 and the ROM 1404 hold user and system data and programs, as is well known in the art.

The computer system 1400 also preferably includes an input/output (I/O) adapter 1405, a communications adapter 1411, a user interface adapter 1408, and a display adapter 1409. The I/O adapter 1405, user interface adapter 1408, and/or communications adapter 1411 may, in certain embodiments, enable a user to interact with computer system 1400 in order to input information.

The I/O adapter 1405 preferably connects to storage device(s) 1406, such as one or more of hard drive, compact disc (CD) drive, floppy disk drive, tape drive, flash drives, USB connected storage, etc. to computer system 1400. The storage devices may be utilized when RAM 1403 is insufficient for the memory requirements associated with storing data for operations of embodiments of the present invention. The data storage of computer system 1400 may be used for storing such information as angle stacks, AVA attributes, intermediate results, and combined data sets, and/or other data used or generated in accordance with embodiments of the present invention. The communications adapter 1411 is preferably adapted to couple the computer system 1400 to a network 1412, which may enable information to be input to and/or output from the system 1400 via the network 1412, e.g., the Internet or other wide-area network, a local-area network, a public or private switched telephony network, a wireless network, or any combination of the foregoing. The user interface adapter 1408 couples user input devices, such as a keyboard 1413, a pointing device 1407, and a microphone 1414 and/or output devices, such as speaker(s) 1415 to computer system 1400. The display adapter 1409 is driven by the CPU 1401 to control the display on the display device 1410, for example, to display information pertaining to a target area under analysis, such as displaying a generated 3D representation of the target area, according to certain embodiments.

It shall be appreciated that the present invention is not limited to the architecture of the computer system 1400 illustrated in FIG. 17. For example, any suitable processor-based device may be utilized for implementing all or a portion of embodiments of the present invention, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

The invention claimed is:

1. A method for transforming PP mode data and PS mode data into an enhanced data representation of a subsurface region, the method comprising:
   obtaining seismic data having PP mode data and PS mode data;
   calculating a first series of one or more seismic attributes describing amplitude variation in the PP mode data as associated with rock properties of the subsurface region;
   calculating a second series of one or more seismic attributes describing amplitude variation in the PS mode data as associated with rock properties of the subsurface region;
wherein attributes are selected and combined such that the attribute combination of the first series is phase consistent with the attribute combination of the second series; and wherein each attribute combination is a weighted combination of the selected one or more attributes, said weights depending on interrelation of PP or PS seismic amplitudes to rock properties;
   performing a refined alignment of at least a portion of the PP mode data to corresponding PS mode data, or the reverse, meaning an alignment in time based at least in part on the first series and the second series, thereby creating aligned PP and PS seismic data attribute volumes; and
   inverting the aligned seismic data attribute volumes to obtain a representation of the subsurface region;
wherein at least one of the calculating, performing, and inverting are performed using a computer.

2. The method of claim 1, wherein the refined alignment is performed using a correlation technique.

3. The method recited in claim 1, wherein all attributes are AVA attributes, or corresponding AVO attributes, and the first series of attributes are selected from a group consisting of A, the PP intercept attribute; B, the PP gradient attribute; and C, a higher-order Aki-Richards attribute; and the second series of attributes are selected from a group consisting of D, the PS gradient attribute; and E, a higher-order Aki-Richards attribute; and wherein a total of at least three attributes are selected, at least one from among A, B and C, and at least one from among D and E.

4. The method of claim 3, wherein the refined alignment is based on a linear combination of the selected at least three attributes.

5. The method of claim 3, wherein at least two of said total of at least three attributes are selected from among A, B and C.

6. The method of claim 1, further comprising performing a first pass alignment of the PS mode data with the PP mode data to create a first pass aligned attribute volume prior to performing the refined alignment.

7. The method of claim 6, wherein the first pass alignment is based at least in part upon a selected horizon that is interpreted to be the same in the PS mode data and the PP mode data.

8. The method of claim 6, wherein the first pass alignment is based at least in part upon an estimate of the $V_p/V_s$ ratio in the seismic data, a time varying function for the $V_p/V_s$ ratio in the seismic data, or a $V_p/V_s$ volume from the seismic data, or any combinations thereof.

9. The method of claim 6, wherein the first pass alignment is performed using offset stacks or angle stacks, or both, of the PP mode data and offset stacks or angle stacks, or both, of the PS mode data.

10. The method of claim 6, wherein the first pass alignment is performed by:
    identifying horizons in the first series and second series that are interpreted to be the same;
    aligning the second series to the first series at the horizons;
    interpolating time shifts of data between the horizons;
    generating a time-transfer function; and
    applying the time-transfer function to the at least a portion of the seismic data.

11. The method of claim 10, wherein the time-transfer function is applied to the PS mode data of the seismic data.

12. The method recited in claim 6, further comprising spectrally balancing the PS mode data and the PP mode data prior to the refined alignment.

13. The method recited in claim 12, wherein performing the refined alignment comprises empirical analysis of the spectrally balanced aligned attribute volume to identify trends in PP mode data and PS mode data.

14. The method recited in claim 1, wherein attributes or combinations of attributes are determined to be phase consistent based at least partly upon analyzing physical data.

15. The method recited in claim 1, wherein attributes or combination of attributes are determined to be phase consistent based at least partly upon seismic modeling from geological scenarios.

16. The method recited in claim 1, wherein performing the refined alignment comprises aligning the first series and the second series using an alternative AVA or AVO parameterization of the PP mode data.

17. The method recited in claim 1, wherein performing the refined alignment comprises lowering an error in a mathematical relationship between combinations of the first series and the second series by shifting time values for points in either the first series or the second series to generate a time-transfer function.

18. The method recited in claim 1, wherein performing the refined alignment comprises applying a time-transfer function to the PS mode data to substantially match the time values of the PS mode data to the time values of the PP mode data.

19. The method recited in claim 1, wherein performing the refined alignment comprises applying a time-transfer function to other data to substantially match time values of the other data to time values of the PP mode data, wherein the other data comprise previously inverted PS seismic data, S-wave impedance data, or combinations thereof.

20. The method of claim 1, wherein the properties of the subsurface region comprise the velocity of P-waves in geological layers, or the velocity of S-waves in the geological layers, or the density of the geological layers, or any combinations thereof.

21. The method of claim 1, wherein the calculating a first series of seismic attributes and the calculating a second series of seismic attributes comprise using Aki-Richards approximations.

22. A method for producing hydrocarbons from a subsurface region, the method comprising:
obtaining seismic data having PP mode data and PS mode data;
calculating a first series of one or more seismic attributes describing amplitude variation in at least a portion of the PP mode data as associated with rock properties of a subsurface region;
calculating a second series of one or more seismic attributes describing amplitude variation in at least a portion of the PS mode data as associated with rock properties of the subsurface region, the attributes in the second series being different from the attributes in the first series;
wherein attributes are selected and combined such that the attribute combination of the first series is phase consistent with the attribute combination of the second series; and wherein each attribute combination is a weighted combination of the selected one or more attributes, said weights depending on interrelation of PP or PS seismic amplitudes to rock properties;
performing a refined alignment of the at least a portion of the PS mode data with the at least a portion of the PP mode data based at least in part on time-aligning the first series and the second series to create a time-transfer function;
applying the time-transfer function to another portion of the seismic data to create an aligned PP and PS seismic data attribute volume;
inverting the aligned seismic data attribute volume to obtain a data representation of a subsurface region;
predicting hydrocarbons based at least in part on the data representation of the subsurface region; and
extracting hydrocarbons from the subsurface regions;
wherein at least one of the calculating, performing, and inverting are performed using a computer.

23. The method of claim 22, further comprising calculating an average low frequency $V_p/V_s$ ratio, called $\gamma_{avg}$, from the time-transfer function, and then converting $\gamma_{avg}$ to a low-frequency interval $V_p/V_s$, called $\gamma_{int}$, and using $\gamma_{int}$ in inverting the aligned data volume.

24. The method of claim 22, further comprising combining the first series and the second series to generate data volumes that relate to subsurface rock and fluid properties, and using these data volumes to predict hydrocarbons by interpreting subsurface lithology, pressure, and fluid saturation distributions.

25. The method of claim 24, wherein the data volumes relating to subsurface rock and fluid properties include at least one of a group consisting of band-limited estimates of P-wave impedance, S-wave impedance, density, S-wave modulus, and combinations thereof.

26. The method of claim 22, wherein the seismic data include data from an initial multi-component survey and at least one multi-component repeat survey conducted later in time, and further comprising using changes in the first series and the second series between repeat multi-component seismic surveys to interpret pressure and fluid saturation changes observed in reservoir monitoring.

27. A tangible computer program product, comprising a non-transitory computer usable medium having a computer readable program code embodied therein, said computer readable program code adapted to be executed to implement a method for transforming PP mode data and PS mode data into an enhanced data representation of a subsurface region, the method comprising:
calculating a first series of one or more seismic attributes describing amplitude variation in PP mode data as associated with rock properties of a subsurface region;
calculating a second series of one or more seismic attributes describing amplitude variation in the PS mode data as associated with rock properties of the subsurface region, the attributes in the second series being different from the attributes in the first series;
wherein attributes are selected and combined such that the attribute combination of the first series is phase consistent with the attribute combination of the second series; and wherein each attribute combination is a weighted combination of the selected one or more attributes, said weights depending on interrelation of PP or PS seismic amplitudes to rock properties;
performing a refined alignment of at least a portion of the seismic data based at least in part on the first series and the second series to create an aligned PP and PS seismic data attribute volume; and
inverting the aligned seismic data attribute volume to obtain a representation of the subsurface region.

28. The tangible, machine-readable medium recited in claim 27, wherein the code adapted to perform the refined alignment comprises an error minimization function.

29. The tangible, machine-readable medium recited in claim 27, wherein the code adapted to perform the refined alignment comprises a mathematical relationship between the first series and the second series.

30. The method of claim 1, wherein the selected attributes are all AVA or corresponding AVO attributes and are as few as two in number based on an alternative parameterization of Aki-Richards equations, one of the two being in the first series and describing variations in the PP mode data, the other of the two being in the second series and describing variations in the PS mode data.

* * * * *